US011240505B2

(12) United States Patent
Poirier et al.

(10) Patent No.: US 11,240,505 B2
(45) Date of Patent: Feb. 1, 2022

(54) AUTOMATED SCANNING ORDER FOR SUB-DIVIDED BLOCKS

(71) Applicant: INTERDIGITAL VC HOLDINGS, INC., Wilmington, DE (US)

(72) Inventors: Tangi Poirier, Cesson-Sevigne (FR); Fabrice Leleannec, Cesson-Sevigne (FR); Fabrice Urban, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/762,184

(22) PCT Filed: Nov. 7, 2018

(86) PCT No.: PCT/US2018/059560
§ 371 (c)(1),
(2) Date: May 7, 2020

(87) PCT Pub. No.: WO2019/094423
PCT Pub. Date: May 16, 2019

(65) Prior Publication Data
US 2020/0359027 A1    Nov. 12, 2020

(30) Foreign Application Priority Data
Nov. 9, 2017    (EP) .................... 17306551

(51) Int. Cl.
*H04N 19/129*    (2014.01)
*H04N 19/119*    (2014.01)
(Continued)

(52) U.S. Cl.
CPC ......... *H04N 19/129* (2014.11); *H04N 19/119* (2014.11); *H04N 19/176* (2014.11); *H04N 19/593* (2014.11); *H04N 19/124* (2014.11)

(58) Field of Classification Search
None
See application file for complete search history.

(56) References Cited

U.S. PATENT DOCUMENTS

| 8,520,732 B2 | 8/2013 | Ye et al. |
| 2005/0089094 A1* | 4/2005 | Yoo .................... H04N 19/593 375/240.12 |

(Continued)

FOREIGN PATENT DOCUMENTS

| CN | 109952761 A | * | 6/2019 | ........... H04N 19/132 |
| EP | 1679903 | | 7/2006 | |

(Continued)

OTHER PUBLICATIONS

Iwamura, et al., Direction Dependent sub-TU Scan Order on Intra Prediction, 2. JVET Meeting, Feb. 20, 2016-Feb. 26, 2016, San Diego, The Joint Video Exploration Team of ISO/IEC JTC1/SC29/WG11 and ITU-T SG.16, URL: http://phenix.int-evry.fr/jvet, No. JVET-B0028, Feb. 15, 2016.

(Continued)

*Primary Examiner* — Chikaodili E Anyikire
(74) *Attorney, Agent, or Firm* — Andrew W. Spicer

(57) ABSTRACT

Different implementations arc described, particularly implementations for selecting a scan order of the sub-blocks of a current block being encoded or decoded when the current block is composed of multiple sub-blocks. In one example, a corresponding dependency number indicative of a number of the other of the plurality of sub-blocks that each of the sub-blocks uses for spatial prediction is determined, based on the corresponding intra prediction mode for the each of
(Continued)

the plurality of sub-blocks. A scan order of the plurality of sub-blocks is determined based on the determined corresponding dependency number for the each of the plurality of the sub-blocks. The current block is encoded or decoded using the determined scan order of the plurality of sub-blocks.

19 Claims, 23 Drawing Sheets

(51) Int. Cl.
*H04N 19/176* (2014.01)
*H04N 19/593* (2014.01)
*H04N 19/124* (2014.01)

(56) References Cited

U.S. PATENT DOCUMENTS

| | | | | |
|---|---|---|---|---|
| 2008/0240585 A1* | 10/2008 | Imajo | ...................... | H04N 19/61 |
| | | | | 382/232 |
| 2014/0254675 A1* | 9/2014 | Lee | ...................... | H04N 19/593 |
| | | | | 375/240.12 |
| 2019/0052909 A1* | 2/2019 | Choi | ...................... | H04N 19/463 |
| 2019/0222837 A1* | 7/2019 | Lee | ...................... | H04N 19/44 |
| 2019/0281297 A1* | 9/2019 | Lee | ...................... | H04N 19/597 |

FOREIGN PATENT DOCUMENTS

| | | | | |
|---|---|---|---|---|
| EP | 1976298 | | 10/2008 | |
| GB | 2496194 A | * | 5/2013 | ............ H04N 19/00 |
| JP | 2008271127 | | 11/2008 | |
| KR | 2013005233 | | 1/2013 | |
| RU | 2447612 | | 4/2012 | |
| WO | WO2010086548 | | 8/2010 | |
| WO | WO 2015124058 A1 | | 8/2015 | |
| WO | WO2016133356 | | 8/2016 | |

OTHER PUBLICATIONS

Shiodera et al., Block Based Extra/Inter-Polating_Prediction for Intra Coding, Image Processing, 2007, ICIP 2007, IEEE International Conference on, IEEE, PI, Sep. 1, 2007, pp. VI-445.

Zheng et al., Intra Prediction With Adaptive CU Processing Order in HEVC, 2014 IEEE International Conference on Image Processing (ICIP), pp. 3724-3728.

* cited by examiner

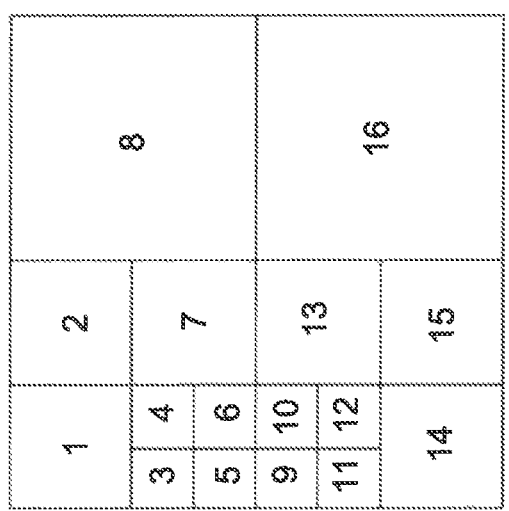
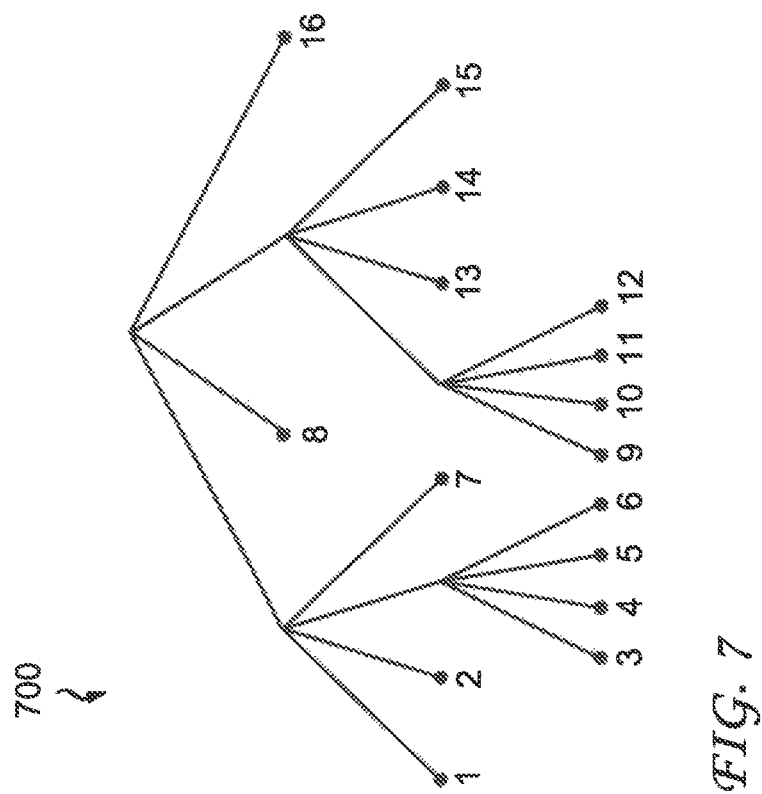
FIG. 7

```
1600 if (puIdx == 0) {
    if (mode <= DC_IDX) {return D_ON_PU1 + D_ON_PU2;}
    else if (mode> VER_IDX){return D_ON_PU1;}
    else if (mode < HOR_IDX) {return D_ON_PU2;}
    else {return IND;}
}
else if (puIdx == 1) {
    if (mode >= VER_IDX) {return IND;}
    else if (mode <= DC_IDX) {return DEP_ON_PU0 + DEP_ON_PU3; }
    else if (mode < HOR_IDX) {return DEP_ON_PU0 + DEP_ON_PU2;}
    else {return DEP_ON_PU0;}
}
else if (puIdx == 2) {
    if (mode <= DC_IDX) {return DEP_ON_PU0 + DEP_ON_PU3; }
    else if (mode <= HOR_IDX) {return IND;}
    else if (mode> VER_IDX) {return DEP_ON_PU0 + DEP_ON_PU1; }
    else {return DEP_ON_PU0;}
}
else{ // (puIdx == 3)
    if (mode >= VER_IDX)  {return DEP_ON_PU1;}
    else if (mode <= HOR_IDX && mode> DC_IDX){return DEP_ON_PU2;}
    else  { return DEP_ON_PU0 + DEP_ON_PU1+ DEP_ON_PU2;}
}
```

*FIG. 16*

AUTOMATED SCANNING ORDER FOR SUB-DIVIDED BLOCKS

TECHNICAL FIELD

At least one of the present embodiments generally relates to. e.g., a method or an apparams for video encoding or decoding, and more particularly, to a method or an apparatus for selecting a scan order of the sub-blocks of a current block being encoded or decoded when lire current block is composed of multiple sub-blocks.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

Recent additions to high compression technology include various versions of the reference software and or documentations JEM (Joint Exploration Model) being developed by the Joint Video Exploration Team (JVET). The aim of JEM is to make improvements to the exiting HEVC (High Efficiency Video Coding/standard. In one JEM version (e.g., "Algorithm Description of Joint Exploration Test Model 5" Document JVET-E100_v2, Joint Video Exploration Team of ISO IEC JTC1/SC29/WG11. 5rd meeting, 12-20 Jan. 2017. Geneva. CH), some further motion models are supported to improve temporal prediction. To do so, a PU (prediction unit) can be spatially divided into sub-PUs and a model can be used to assign each sub-PU a dedicated motion vector.

In more recent versions of the JEM (e.g., "Algorithm Description of Joint Exploration "Test Model 2", Document JVET-B1001_v3. Joint Video Exploration Team of ISO/IEC JTC1/SC29 WG11.2rd meeting, 20-26 Feb. 2016, Sin Diego, USA"), a CU (coding unit) is no longer specified to lie divided into PUs or TUs (transform units). Instead, more flexible CU sizes may be used, and some motion data are directly assigned to each CU. In this new codec design under the newer versions of JEM, a CU may be divided into sub-CUs and a motion vector may be computed for each sub-CU of the divided CU.

SUMMARY

According to a general aspect of at least one embodiment, a method for video encoding is presented, comprising: determining, for a current block being encoded in a picture, an infra prediction mode for each of the plurality of sub-blocks being subdivided from the current block; determining, based on the corresponding determined ultra prediction mode for the each of the plurality of sub-blocks, a corresponding dependency number indicative of a number of other of the plurality of sub-blocks the each of the plurality of sub-blocks uses for spatial prediction of the each of the plurality of sub-blocks; determining a scan order of the plurality of sub-blocks based on the determined corresponding dependency number for the each of the plurality of the sub-blocks; and encoding the current block using the determined scan order of the plurality of sub-blocks.

According to another general aspect of at least one embodiment, a method for video decoding is presented, comprising: determining, for a current block being decoded in a picture, an intra prediction mode for each of the plurality of sub-blocks being subdivided from the current block: determining, based on the corresponding determined intra prediction mode for die each of the plurality of sub-blocks, a corresponding dependency number indicative of a number of other of the plurality of sub-blocks the each of the plurality of sub-blocks uses for spatial prediction of the each of the plurality of sub-blocks: determining a scan order of the plurality of sub-blocks based on the determined corresponding dependency number for the each of the plurality of the sub-blocks: and decoding the current block using the determined scan order of the plurality of sub-blocks.

According to another general aspect of at least one embodiment, an apparatus for video encoding is presented, comprising: means for determining, for a current block being encoded in a picture, an intra prediction mode for each of the plurality of sub-blocks being subdivided from the current block; means for determining, based on the corresponding determined infra prediction mode for the each of the plurality of sub-blocks, a corresponding dependency number indicative of a number of other of the plurality of sub-blocks the each of the plurality of sub-blocks uses for spatial prediction of the each of the plurality of sub-blocks: means for determining a scan order of the plurality of sub-blocks based on the determined corresponding dependency number for the each of the plurality of the sub-blocks: and means for encoding the current block using the determined scan order of the plurality of sub-blocks.

According to another general aspect of at least one embodiment, an apparatus for video decoding is presented, comprising, means for determining, for a current block being decoded in a picture. an intra prediction mode for each of the plurality of sub-blocks being subdivided from the current block; means for determining, based on the corresponding determined intra prediction mode for the each of the plurality of sub-blocks, a corresponding dependency number indicative of a number of other of the plurality of sub-blocks the each of the plurality of sub-blocks uses for spatial prediction of the each of the plurality of sub-blocks: means for determining a scan order of the plurality of sub-blocks based on the determined corresponding dependency number for the each of the plurality of the sub-blocks; and means for decoding the current block using the determined scan order of the plurality of sub-blocks.

According to another general aspect of at least one embodiment, an apparatus for video encoding is provided, comprising: one or more processors, and at least one memory; wherein die one or more processors is configured to: determine, for a current block being encoded in a picture, an intra prediction mode for each of the plurality of sub-blocks being subdivided from the current block: determine, based on the corresponding determined intra prediction mode for the each of the plurality of sub-blocks, a corresponding dependency number indicative of a number of other of the plurality of sub-blocks the each of the plurality of sub-blocks uses for spatial prediction of the each of the plurality of sub-blocks; determine a scan order of the plurality of sub-blocks based on the determined corresponding dependency number for the each of the plurality of the sub-blocks: and encode tie current block using the determined scan order of the plurality of sub-blocks.

According to another general aspect of at least one embodiment, an apparatus for video decoding is provided, comprising: one or more processors and at least one memory; wherein the one or more processors is configured to: determine, for a current block being decoded in a picture, an intra prediction mode for each of the plurality of sub-blocks being subdivided from the current block, determine, based on the corresponding determined intra prediction mode for the each of the plurality of sub-blocks, a corresponding dependency number indicative of a number of other of the plurality of sub-blocks the each of the plurality of sub-blocks uses for spatial prediction of the each of the plurality of sub-blocks: determine a scan order of the plurality of sub-blocks based on the determined corresponding dependency number for the each of the plurality of the sub-blocks: and decode the current block using the determined scan order of the plurality of sub-blocks.

According to another general aspect of at least one embodiment, the scan order is determined by having a sub-block with a lower dependency number being encoded or decoded before another sub-block having a higher dependency number.

According to another general aspect of at least one embodiment, the scan order is determined in that if two sub-blocks of the plurality of the sub-blocks have same determined dependency numbers, a z-scan order is used for scanning the two sub-blocks.

According to another general aspect of at least one embodiment, if a selected sub-block has an intra prediction mode of DC or planar then the determined dependency number for the selected sub-block is set to a default number.

According to another general aspect of at least one embodiment, the default number is 0.1,2 or 3.

According to another general aspect of at least one embodiment, if one of the plurality of the sub-blocks is further subdivided into a plurality of further-subdivided sub-blocks, the a scan order of the plurality of the further-subdivided sub-blocks is set to be same as the determined scan order of the plurality of the sub-blocks.

According to another general aspect of at least one embodiment, the determined scan order of the plurality of the sub-blocks is signaled in a bitstream representing the picture.

According to another general aspect of at least one embodiment, the plurality of sub-blocks are prediction blocks.

According to another general aspect of at least one embodiment, the current block is luma coded.

According to another general aspect of at least one embodiment, a non-transitory computer readable medium is presented containing data content generated according to the method or the apparatus of any of the preceding descriptions.

According to another general aspect of at least one embodiment, a signal is provided comprising video data generated according to the method or the apparatus of any of the preceding descriptions.

One or more of the present embodiments also provide a computer readable storage medium having stored thereon instructions for encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

BRIEF DESCRIPTION OF THE DRAWINGS

FIG. 7 illustrates an example of z-scan order for a plurality of blocks.

FIG. 16 illustrates another example method according to a general aspect of at least one embodiment.

DETAILED DESCRIPTION

Figure 1:
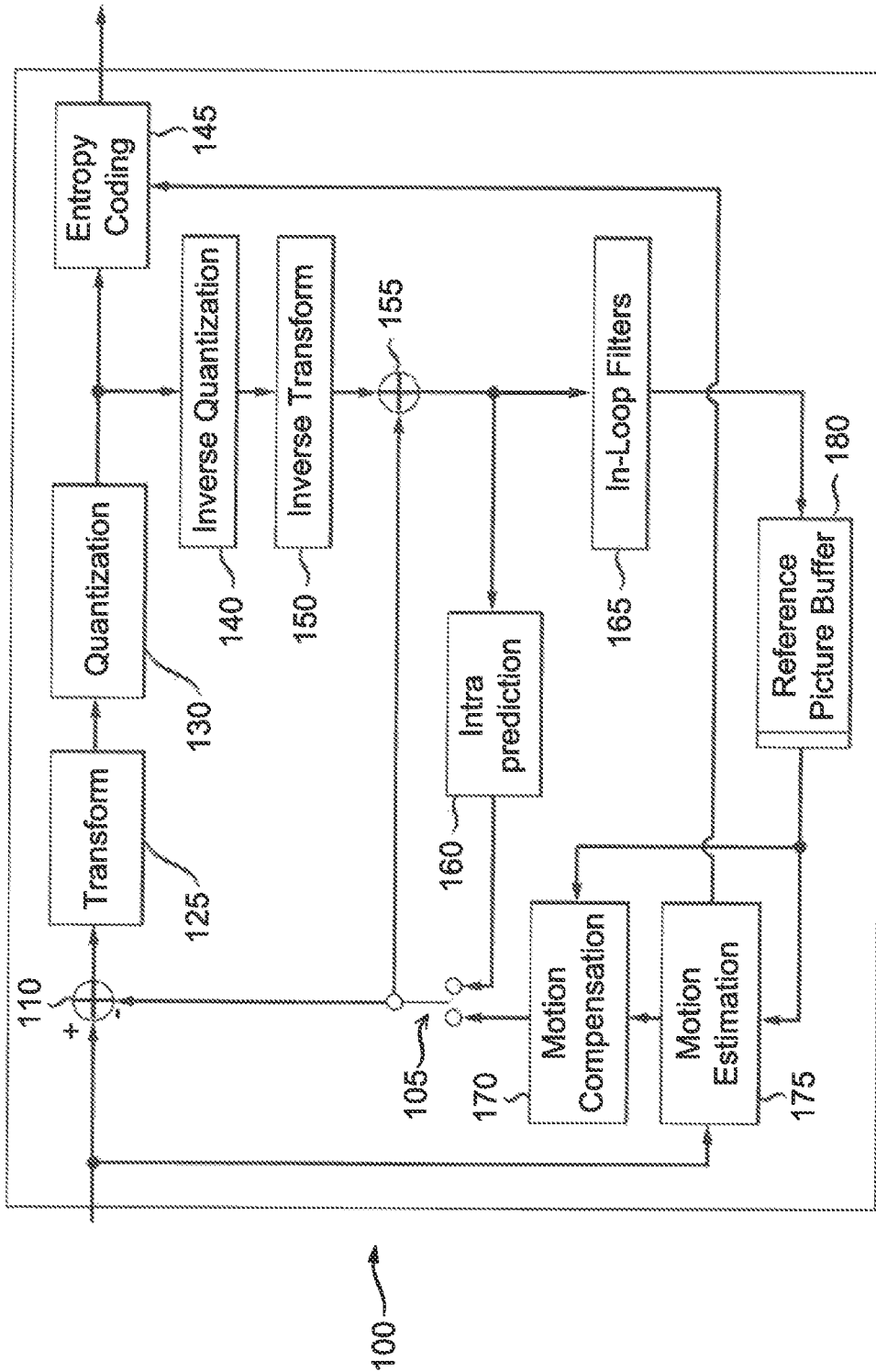
FIG. 1 illustrates a block diagram of an embodiment of an HEVC (High Efficiency Video Coding) video encoder.

FIG. 1 illustrates an exemplary High Efficiency Video Coding (HEVC) encoder 100. HEVC is a compression standard developed by Joint Collaborative Team on Video Coding (JCT-VC) (see, e.g. "ITU-T H.265 TELECOMMUNICATION STANDARDIZATION SECTOR OF ITU (October/2014). SERIES H: AUDIOVISUAL AND MULTIMEDIA SYSTEMS, Infrastructure of audiovisual services—Coding of moving video, High efficiency video coding, Recommendation ITU-T H.265").

In HEVC, to encode a video sequence with one or more pictures, a picture is partitioned into one or more slices where each slice can include one or more slice segments. A slice segment is organized into coding units, prediction units, and transform units.

In the present application, the terms "reconstructed" and "decoded" may be used interchangeably, the terms "encoded" or "coded" may be used interchangeable, and the terms "picnuc" and "frame" may be used interchangeably. Usually, but uot necessarily, the term "reconstructed" is used at the eucoder side while "decoded" is used at the decoder side.

The HEVC specification distinguishes between "blocks" and "units." where a "block" addresses a specific area in a sample array (e.g. luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB). and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TIJ includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

Figure 6:
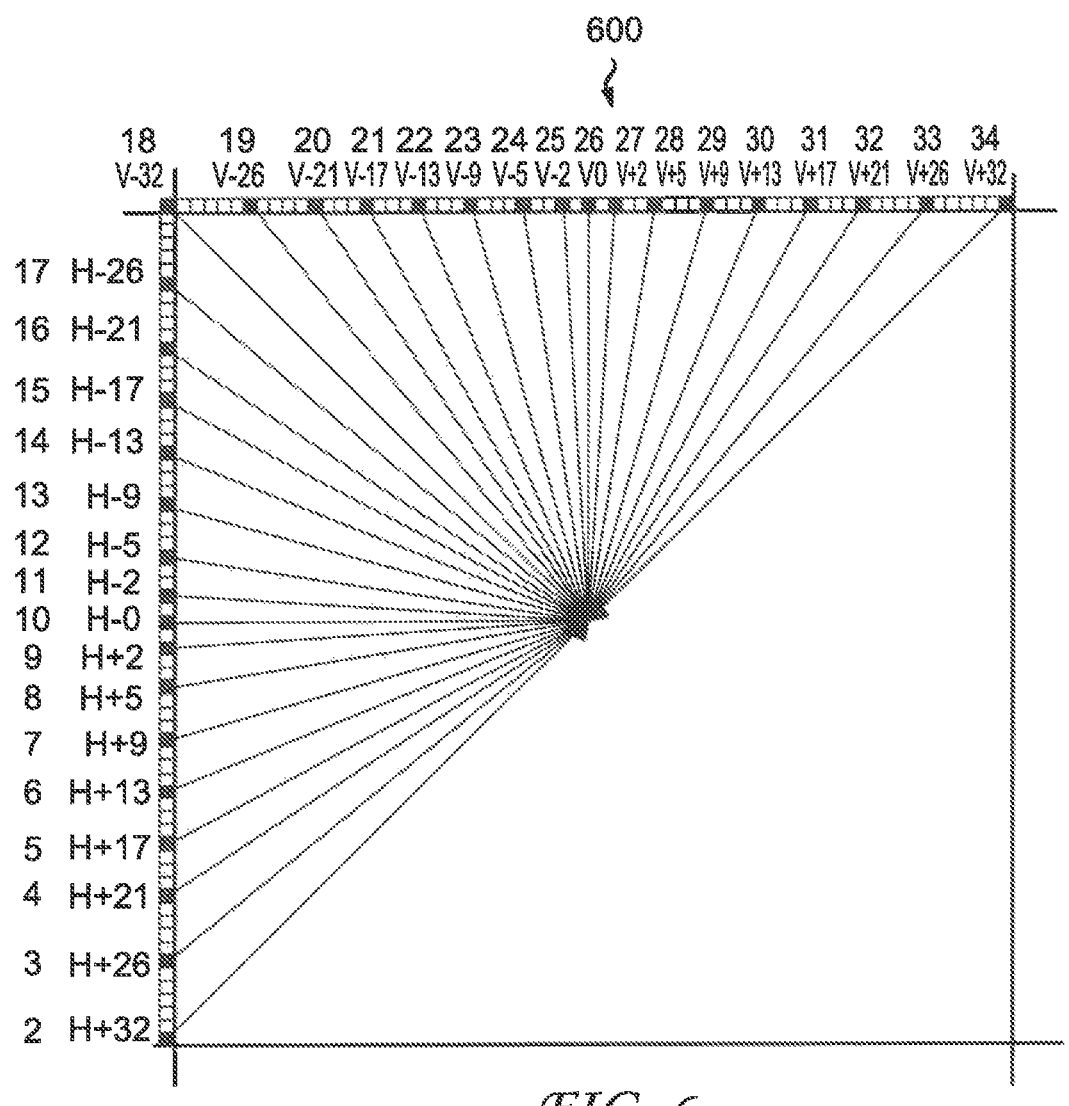
FIG. 6 illustrates different intra predict ion modes for HEVC.

FIG. 6 illustrates the 33 angular prediction modes (numbered from 2 to 34) iu HEVC with angle definitions corresponding to each of the angular intra prediction modes. The associated displacement parameters H and V are used to indicate the horizontal and vertical directionalities respectively, while the numeric part of the identifier refers to the sample position displacement in $\frac{1}{32}$ fractions of sample grid positions.

The applicable hum intra prediction mode for the current block can be coded using two different options. If the applicable mode is included in a constructed list of three most probable modes (MPM). the mode is signaled by an index in the MPM list. Otherwise, the mode is signaled by a fixed-length binarizatiou of the mode index. The three most probable modes ar e derived from the intra prediction modes of the top and left neighboring blocks.

For an inter CU, the corresponding coding block is further partitioned into one or more prediction blocks. Inter prediction is performed on the PB level, and fire corresponding PU contains the information about how inter prediction is performed. The motion information (i.e., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

Figure 2A:
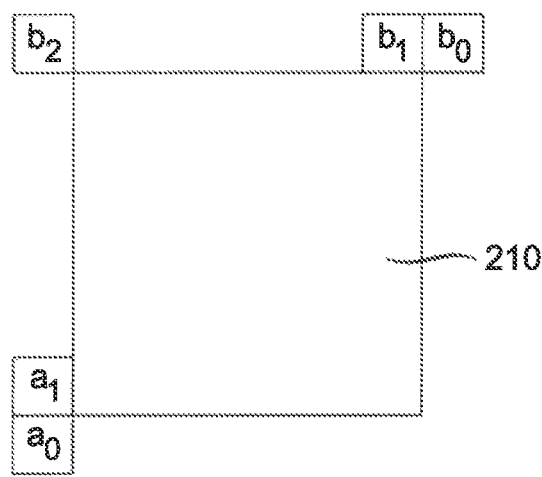
FIG. 2A is a pictorial example depicting the positions of five spatial candidates {a1, b1, b0, a0, b2} for a current block.

The set of possible candidates in the merge mode consists of spatial neighbor candidates, a temporal candidate, and generated candidate; FIG. 2A shows the positions of five spatial candidates $\{a_1, b_1, b_0, a_0, b_2\}$ for a current block 210, wherein $a_0$ and $a_1$ are to the left of the current block, and $b_1$, $b_0$, $b_2$ are at the top of the current block. For each candidate position, the availability is checked according to the order of $a_1, b_1, b_0, b_0, a_0, b_2$, and then the redundancy in candidates is removed.

The motion vector of the collocated location iu a reference picture can be used for derivation of a temporal candidate. The applicable reference picture is selected on a slice basis and indicated in the slice header, and the reference index for the temporal candidate is set to $i_{ref}=0$. If the POC distance (td) between the picture of the collocated PU and the reference picture horn which the collocated PU is predicted from, is the same as the distance (tb) between the current picture and the reference picture containing the collocated PU. the collocated motion vector $mv_{col}$ can be directly used as the temporal candidate. Otherwise, a scaled motion vector, $tb/td*mv_{col}$, is used as the temporal candidate. Depending on where the current PU is located, the collocated PU is determined by the sample location at the bottom-right or at the center of the current PU.

The maximum number of merge candidates, N, is specified in the slice header. If the number of merge candidates is larger than N, only the first N-1 spatial candidates and the temporal candidate are used. Otherwise, if the number of merge candidates is less than N, the set of candidates is filled up to the maximum number N with generated candidates as combinations of already present candidates, or null candidates. The candidates used in the merge mode may be referred to as "merge candidates" in the present application.

If a CU indicates a skip mode, the applicable index fen the merge candidate is indicated only if the list of merge candidates is larger than 1, and no further information is coded for the CU. In the skip mode, the motion vector is applied without a residual update.

In AMVP, a video encoder or decoder assembles candidate lists based on motion vectors determined from already coded blocks. The video encoder then signals an index in the candidate list to identity a motion vector predictor (MVP) and signals a motion vector difference (MVD). At the decoder side, tie motion vector (MV) is reconstructed as MVP+MVD. The applicable reference picture index is also explicitly coded in the PU syntax for AMVP.

Only two spatial motion candidates are chosen in AMVP. The first spatial motion candidate is chosen from left positions $\{a_0, a_1\}$ and the second one from the above positions $\{b_0, b_1, b_2\}$, while keeping the searching order as indicated in the two sets. If the number of motion vector candidates is not equal to two. the temporal MV candidate can be included. If the set of candidates is still not fully filled, then zero motion vectors are used.

If the reference picture index of a spatial candidate corresponds to the reference picture index for the current PU (i.e., using the same reference picture index or both using long-term reference pictures, independently of the reference picture list), the spatial candidate motion vector is used directly. Otherwise, if both reference pictures are short-term ones, the candidate motion vector is scaled according to the distance (tb) between the current picture and the reference picture of the current PU and the distance (td) between the current pichue and the reference picture of the spatial candidate. The candidates used in the AMVP mode may be referred to as "AMVP candidates" in the present application.

For ease of notation, a block tested with the "inerge" mode at the encoder side or a block decoded with the "merge" mode at the decoder side is denoted as a "inerge" block, and a block tested with the AMVP mode at the encoder side or a block decoded with the AMVP mode at the decoder side is denoted as an "AMVP" block.

Figure 2B:
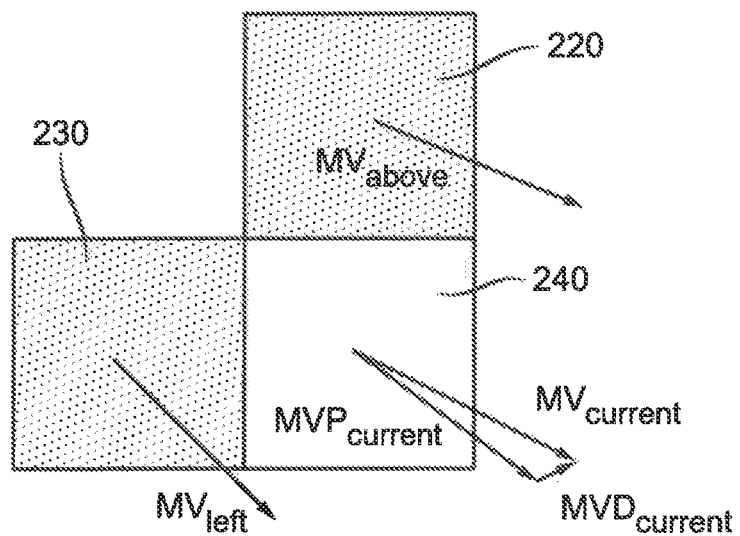
FIG. 2B is a pictorial example depicting an exemplary motion vector representation using AMVP (Advanced Motion Vector Prediction).

FIG. 2B illustrates an exemplary motion vector representation using AMVP. For a current block 240 to be encoded, a motion vector ($MV_{current}$) can be obtained through motion estimation. Using the motion vector ($MV_{left}$) from a left block 230 and the motion vector ($MV_{above}$) from the above block 220, a motion vector predictor can be chosen from $MV_{left}$ and $MV_{above}$ as $MVP_{currant}$. A motion vector difference then can be calculated as $MVD_{currant} = MV_{currant} - MVP_{currant}$.

Motion compensation prediction can be performed using one or two reference pictures for prediction. In P slices, only a single prediction reference can be used for Inter prediction, enabling uni-prediction for a prediction block. In B slices, two reference picture lists are available, and uni-prediction or bi-prediction can be used. In bi-prediction, one reference picture from each of the reference picture lists is used.

In HEVC, the precision of the motion information for motion compensation is one quarter-sample (also referred to as quarter-pel or ¼-pel) for the luma component and one eighth-sample (also referred to as ⅛-pel) for the chroma components for the 4:2:0 configuration. A 7-tap or 8-tap interpolation filter is used for interpolation of fractional-sample positions, i.e., ¼, ½ and ¾ of full sample locations in both horizontal and vertical directions can be addressed for luma.

The prediction residuals are then transformed (125) and quantized (130). The quantized transform coefficients, as well as motion vectors and other syntax elements, are entropy coded (145) to output a bitstream. The encoder may also skip the transform and apply quantization directly to the ion-transformed residual signal on a 4x4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes au encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking. SAO (Sample Adaptive Offset) filtering to reduce encoding artifacts. The filtered image is stored at a reference picture buffer (180).

Figure 3:
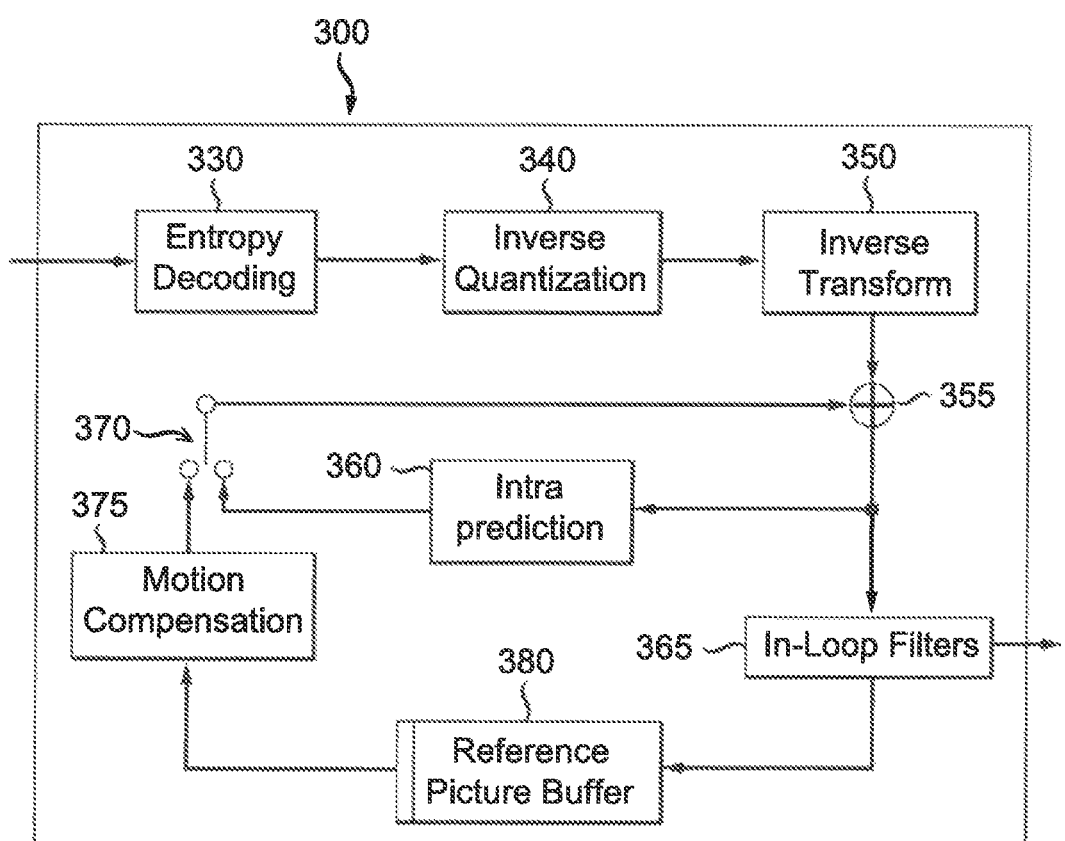
FIG. 3 illustrates a block diagram of an embodiment of an HEVC video decoder.

FIG. 3 illustrates a block diagram of an exemplary HEVC video decoder 300. In the exemplary decoder 300, a bitstream is decoded by the decoder elements as described below. Video decoder 300 generally performs a decoding pass reciprocal to the encoding pass as described in FIG. 1. which performs video decoding as part of encoding video data.

In particular, the input of the decoder includes a video bitstream, which may be generated by video encoder 100. The bitsueam is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). As described above. AMVP and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

Figure 4:
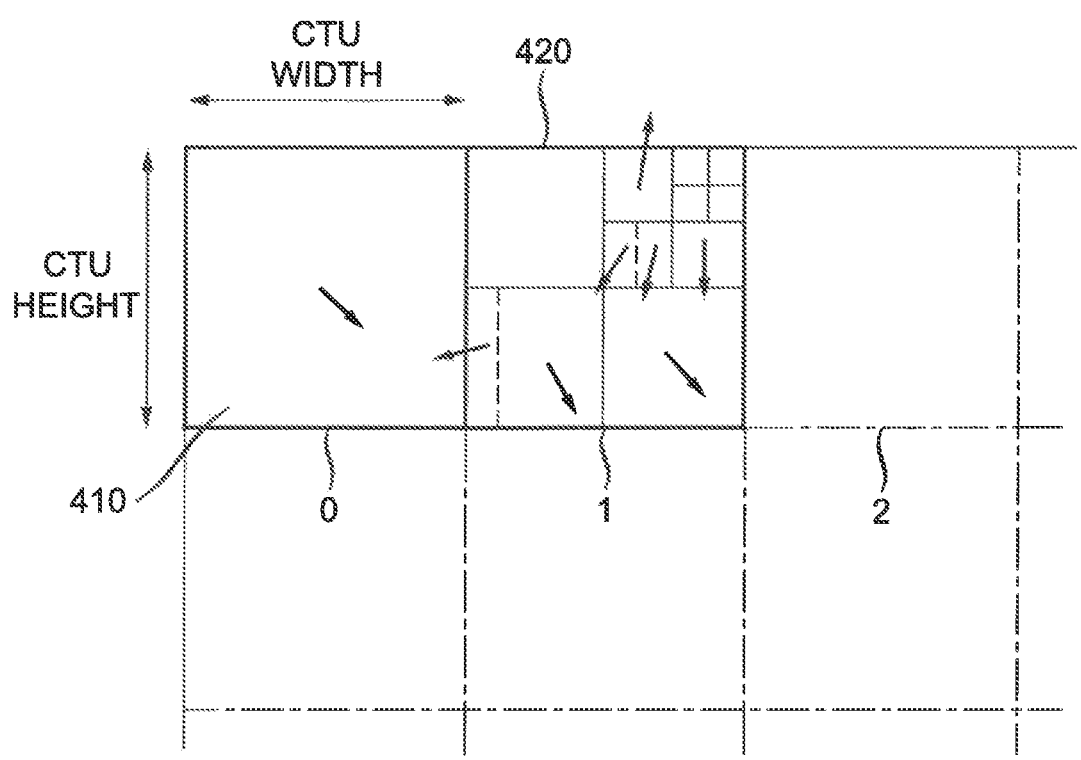
FIG. 4 illustrates an example of Coding Tree Unit (CTU) and Ceding Tree (CT) concepts to represent a compressed HEVC picture.
Figure 5A:
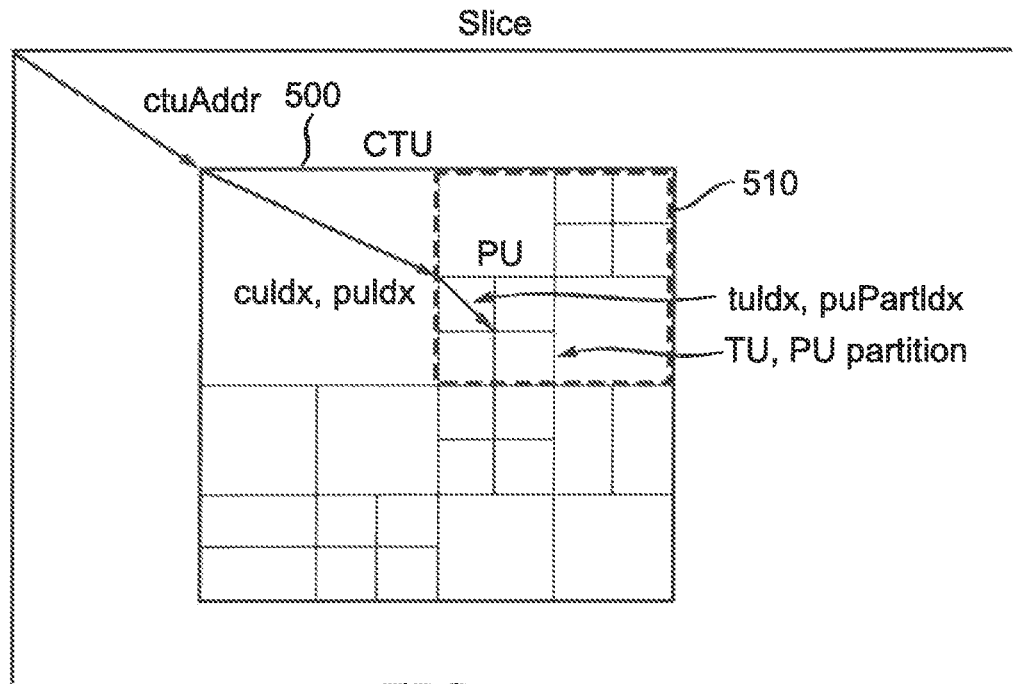
FIG. 5A illustrates an example of divisions of a Coding Tree Unit (CTU) into Coding Units (CUs), Prediction Units (PUs), and Transform Units (TUs).

As mentioned, in HEVC. motion compensated temporal prediction is employed to exploit the redundancy that exists between successive pictures of a video. To do that, a motion vector is associated with each prediction unit (PU). As explained above, each CTU is represented by a Coding Tree in the compressed domain. This is a quad-tree division of the CTU, where each leaf is called a Coding Unit (CU) and is also illustrated in FIG. 4 for CTUs 410 and 420. Each CU is then given some Inna or Inter prediction parameters as prediction information. To do so, a CU may be spatially partitioned into one or more Prediction Units (PUs), each PU being assigned some prediction information. The Intra or Inter coding mode is assigned on the CU level. These concepts are further illustrated in FIG. 5A for an exemplary CTU 500 and a CU 510.

Figure 5B:
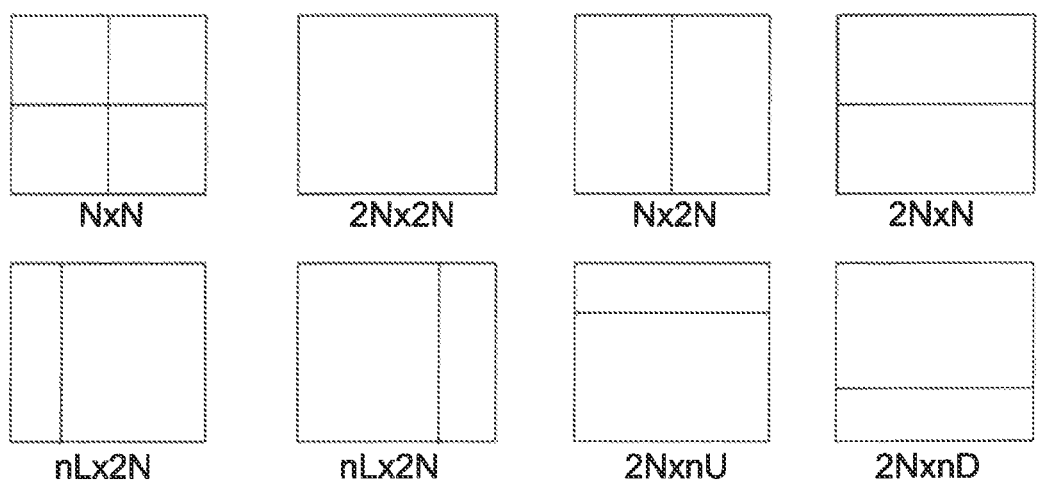
FIG. 5B illustrates different partition types.

The various partition types are illustrated on FIG. 5B. They include square partitions (2N×2N and N×N), which are the only ones used in both intra and inter CUs, symmetric non-square partitions (2N×N, N×2N), used only in inter CUs, and asymmetric partitions (bottom row), used only in inter CUs.

The CUs inside a CTU are coded in a depth-first order. The coding order is also referred to as a z-scan order and is illustrated iu FIG. 7. In FIG. 7, the z-scan order is numbered from 1 to 16 with 1 being the first block being coded or decoded. The z-scan order ensures that for each CU being coded, except those located at the top or left boundary of a slice, all samples above the CU and left to the CU have already been coded or decoded, so that the corresponding samples can be used for intra prediction and the associated coding parameters can be used for predicting the coding parameters of the current CU.

In HEVC, one motion vector is assigned to each PU. This motion vector is used for motion compensated temporal prediction of the considered PU. Therefore, in HEVC, the motion model that links a predicted block and its reference block simply consists of a translation or calculation based on the reference block and the corresponding motion vector.

As mentioned, present principles aim at improving the compression efficiency, compared to the state of the art video codecs. Improving the compression efficiency means decreasing the average bitrate at a given objective quality (PSNR, Peak Signal-to-Noise Ratio) level, or increasing the objective quality at a given bitrate. Accordingly, one exemplary aspect of the present principles improves the coding efficiency of intra coded blocks, where the intra coded block coding involves a prediction, residual computation, transform, quantization and entropy coding. In one exemplary embodiment, a current block being coded is further divided into a plurality of sub-blocks. These sub-blocks may be sub-CUs. prediction blocks or transform blocks.

An existing technique to manage multiple blocks or sub-blocks scanning order consists in deriving the scanning order of transform units spatially covered by a unique prediction unit as a function of the intra prediction direction associated to that prediction unit. This technique is described in "Direction-dependent sub-TV scan order on intra prediction", Shunsuke Iwamura, Atsuro Ichigaya (NHK). Document JVET-B0028, Joint Video Exploration Team (JVET) of ITU-T SG 16 WP 3 and ISO/IEC JTC 1/SC 29/WG 11, 2nd Meeting: San Diego, USA, 20-26 Feb. 2016.

Figure 8A:
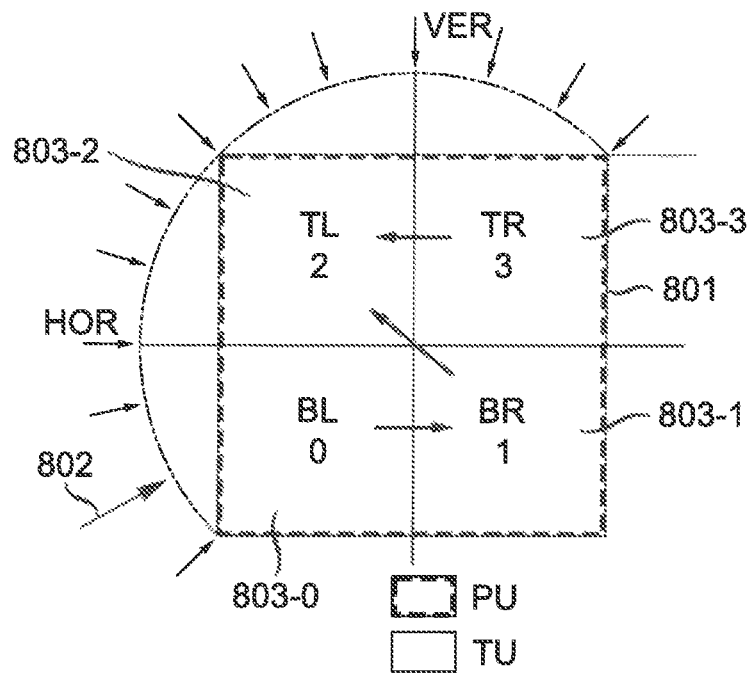
FIG. 8A and FIG. 8B illustrate an existing technique for determining a scan order.
Figure 8B:
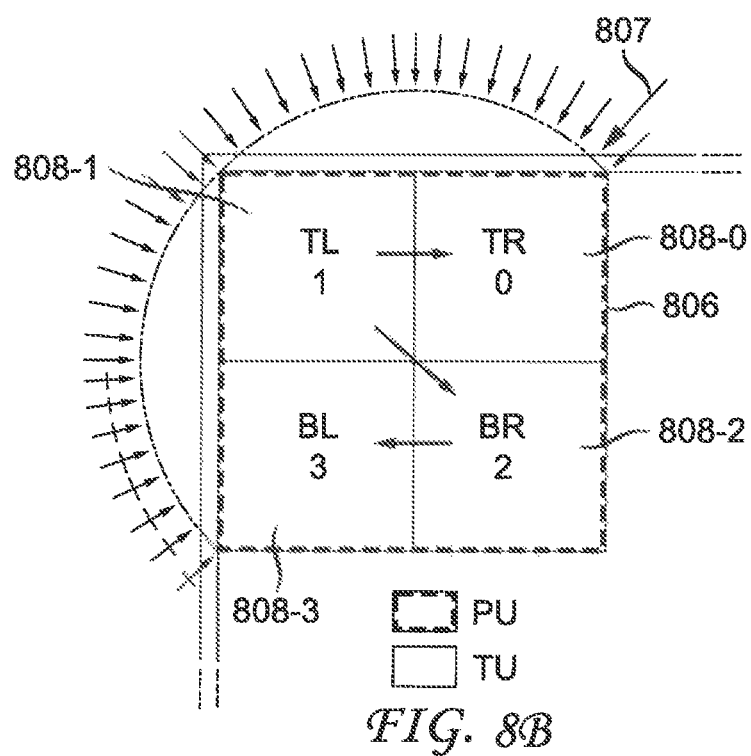

FIGS. 8A and 8B illustrate the concept of this existing technique. As shown in FIG. 8A, die intra prediction mode of the prediction unit 801 has an associated intra prediction direction as indicated by an arrow 802. Based on this direction 802. the scan order of the transform units 803-0 to 803-3 is determined. That is, the scan order (as indicated by the numbers 0 to 3) is in the direction of up and right, the same as the direction indicated by the arrow 802. Likewise, FIG. 8B shows the directional arrow 807 indicating the direction of the intra prediction mode for the PU 806. This direction as indicated by the directional arrow 807 is then used as the scan order direction of the sub-divided transform units 808-1 to 808-3 (i.e., down and left).

The benefit of above existing approach is diat it increases the number of reference samples available to perform intra prediction in a closed-loop manner from TU to TU during the coding and decoding processes. Thus, the overall accuracy of intra prediction is increased and the coding efficiency is improved.

Accordingly, the present proposed solution consists in an antomatic derivation of the scanning order of sub-blocks contained m a given block, as a function of the intra prediction directions respectively assigned to each PU in the considered CU. This antomatic derivation can then be used in different ways to improve the coding efficiency. The sub-block scanning order used is systematically deduced from the corresponding ultra prediction mode or direction assigned to each of the sub-block contained in the considered block. The derived sub-block scanning order is used to improve the coding and decoding of the scan order of the previously mentioned existing technique. In one exemplary embodiment, the current block being considered may be an intra predicted CU and the sub-block may be an mtra predicted PU, TU or a sub-CU.

Figure 9:
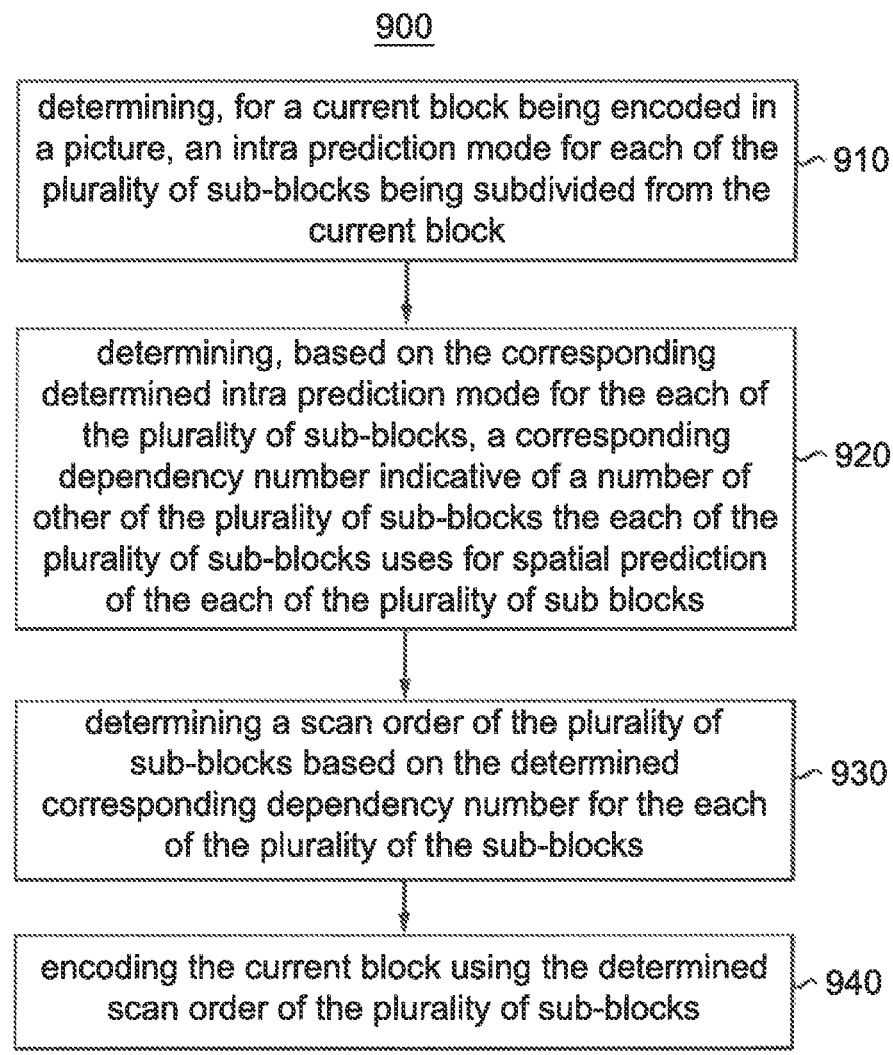
FIG. 9 illustrates an example method according to a general aspect of at least one embodiment.

Accordingly. FIG. 9 illustrates an exemplary encoding method 900 according to a general aspect of at least one embodiment of the present principles. At 910. the method 900 determines, for a current block being encoded in a picture, an intra prediction mode for each of the plurality of sub-blocks being subdivided from the current block. At 920, the method 900 determines, based on the corresponding determined intra prediction mode for the each of the plurality of sub-blocks, a corresponding dependency number indicative of a number of other of the plurality of sub-blocks the each of the plurality of sub-blocks uses for spatial prediction of the each of the plurality of sub-blocks. At 930. the method 900 determines a scan order of the plurality of sub-blocks based on the determined corresponding dependency number for the each of the plurality of the sub-blocks. At 940. the method 900 encodes the current block using the determined scan order of the plurality of sub-blocks.

Figure 10:
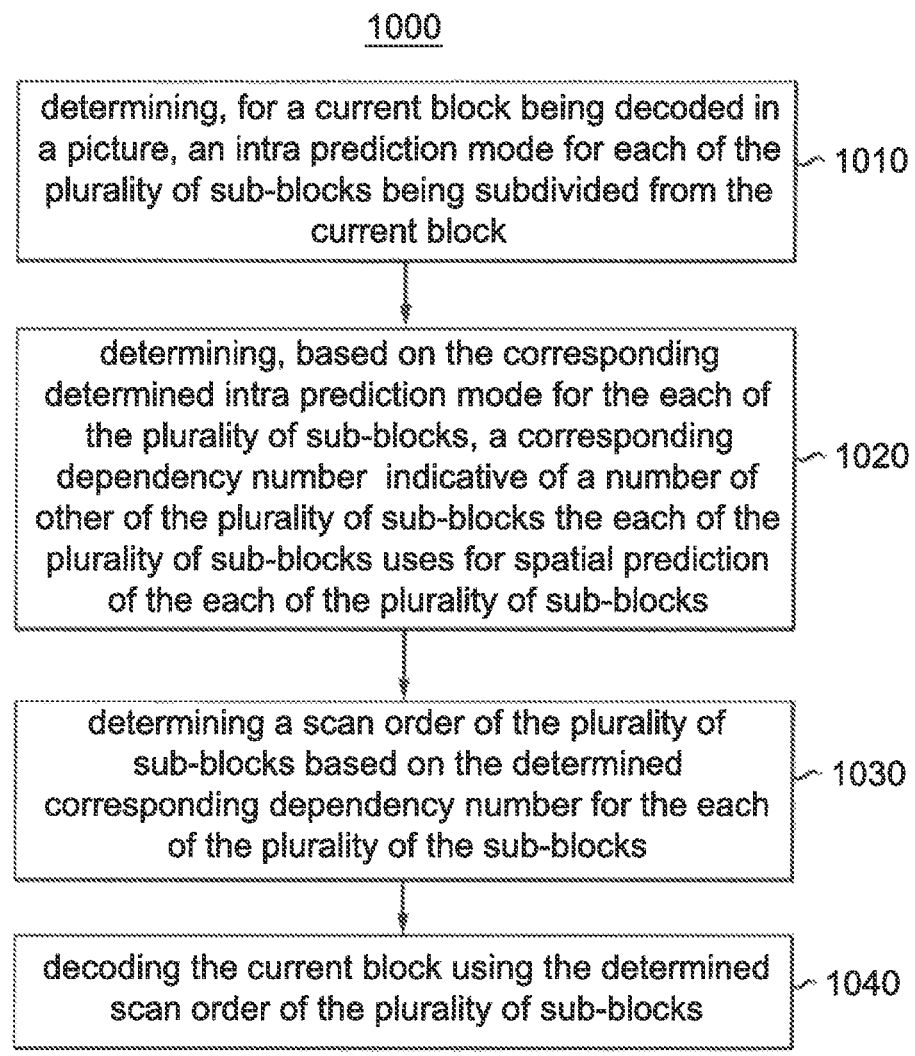
FIG. 10 illustrates another example method according to a general aspect of at least one embodiment.

Likewise, FIG. 10 illustrates an exemplary decoding method 1000 according to a general aspect of at least one embodiment of the present principles At 1010, the method 1000 determines, for a current block being decoded in a picture, an intra prediction mode for each of the plurality of sub-blocks being subdivided from the current block. At 1020. the method 1000 determines, based on the corresponding determined intra prediction mode for the each of the plurality of sub-blocks, a corresponding dependency number indicative of a number of other of the plurality of sub-blocks the each of the plurality of sub-blocks uses for spatial prediction of the each of the plurality of sub-blocks. At 1030, the method 1000 determines a scan order of the plurality of sub-blocks based on the determined corresponding dependency number for the each of the plurality of the sub-blocks. At 1040, the method 1000 decodes the current block using the determined scan order of the plurality of sub-blocks.

Figure 11:
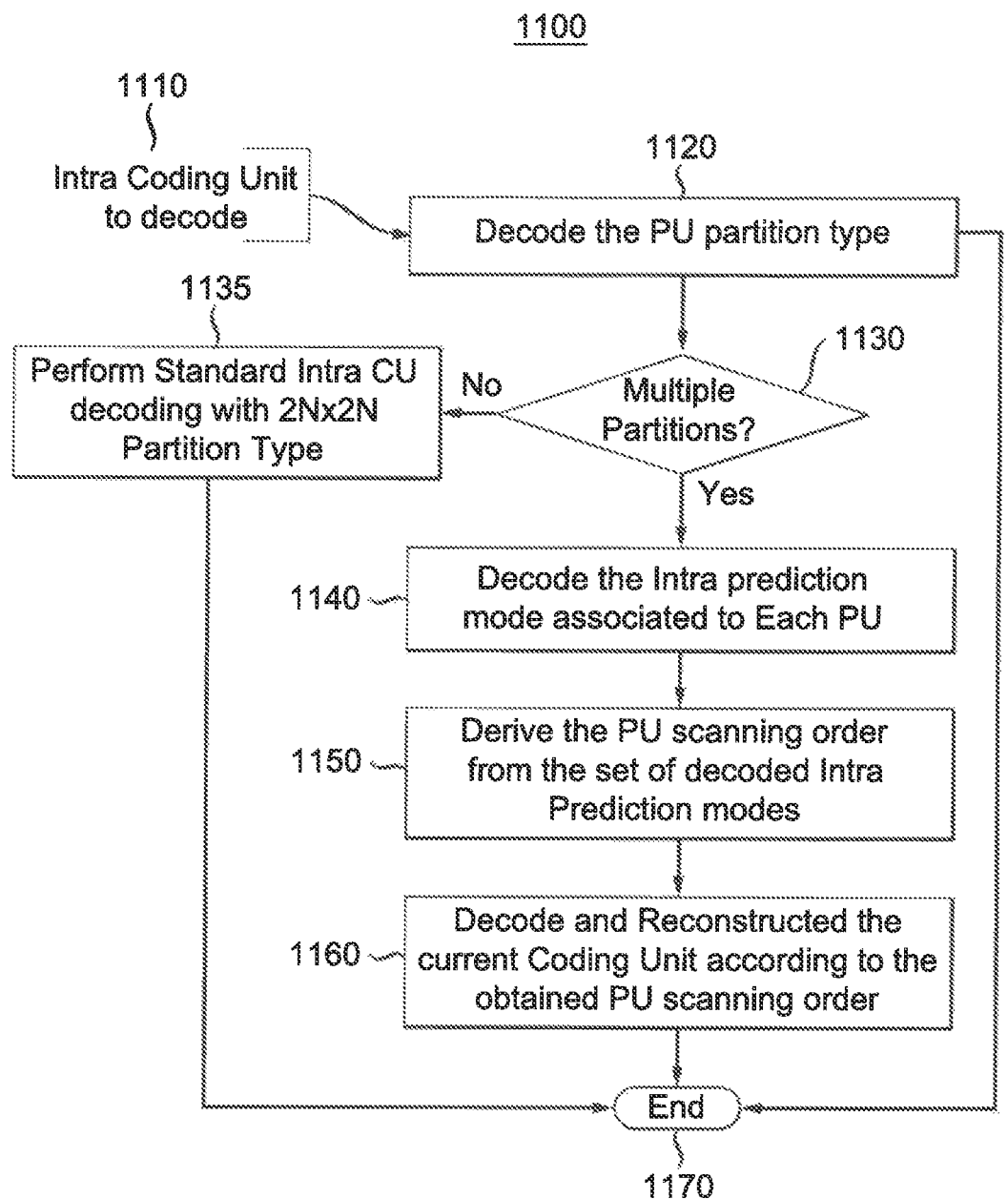
FIG. 11 illustrates another example method according to a general aspect of at least erne embodiment.

FIG. 11 illustrates the detail of an embodiment of a process syntax 1100 used to der3ive an efficient scan order for a plurality of PUs which are sub-divided from au intra CU being decoded. The input to process 1100 is a CU that is assigned intra coding mode as shown at 1110 of FIG. 11. At 1120, process 1100 determines and decodes the PU partition type (i.e., how the CU is being partitioned into different PUs as shown in FIG. 7). At 1130, process 1100 verifies whether the CU has been partitioned or sub-divided into multiple PUs. If yes, then at 1140, process 1100 parses and decodes the intra prediction mode associated with each of the sub-divided PUs. The intra prediction modes may be e.g., one of the 34 intra prediction modes in HEVC as already described previously. At 1150, method 1100 derives the PU scanning order as a function of the intra prediction modes or the associated directions assigned to each PU. This particular exemplary aspect will also be described in further detail Later. At 1160. given this scanning order, method 1100 is able to successively decode and reconstruct the CU. To do so. each Transform Unit contained in the CU is decoded and reconstructed. This TU reconstruction process is done such that all TU spatially located in a given PU are reconstructed before the decoder starts reconstructing the TU contained in the next PU, according to the determined PU scanning order. As described previously, the TU reconstruction involves the inverse transform of decoded transform coefficients, their inverse quantizations (which provide a texture residual TU). intra prediction, the addition of the obtained predictor and residual, and finally one or more post-processing steps (de-blocking filter, sample adaptive offset, adaptive loop filter). If the cunent CU is not further partitioned into multiple PUs as determined at 1130, then no scan order for any sub-division is required and the current CU is decoded as a whole at 1135.

According to a non-limiting embodiment, the TU entropy decoding process is independent from the PU scanning order (hence only the reconstruction process follows the determined PU scanning order). According to another non-limiting embodiment, the TU entropy decoding also follows the determined PU scanning order.

Figure 12:
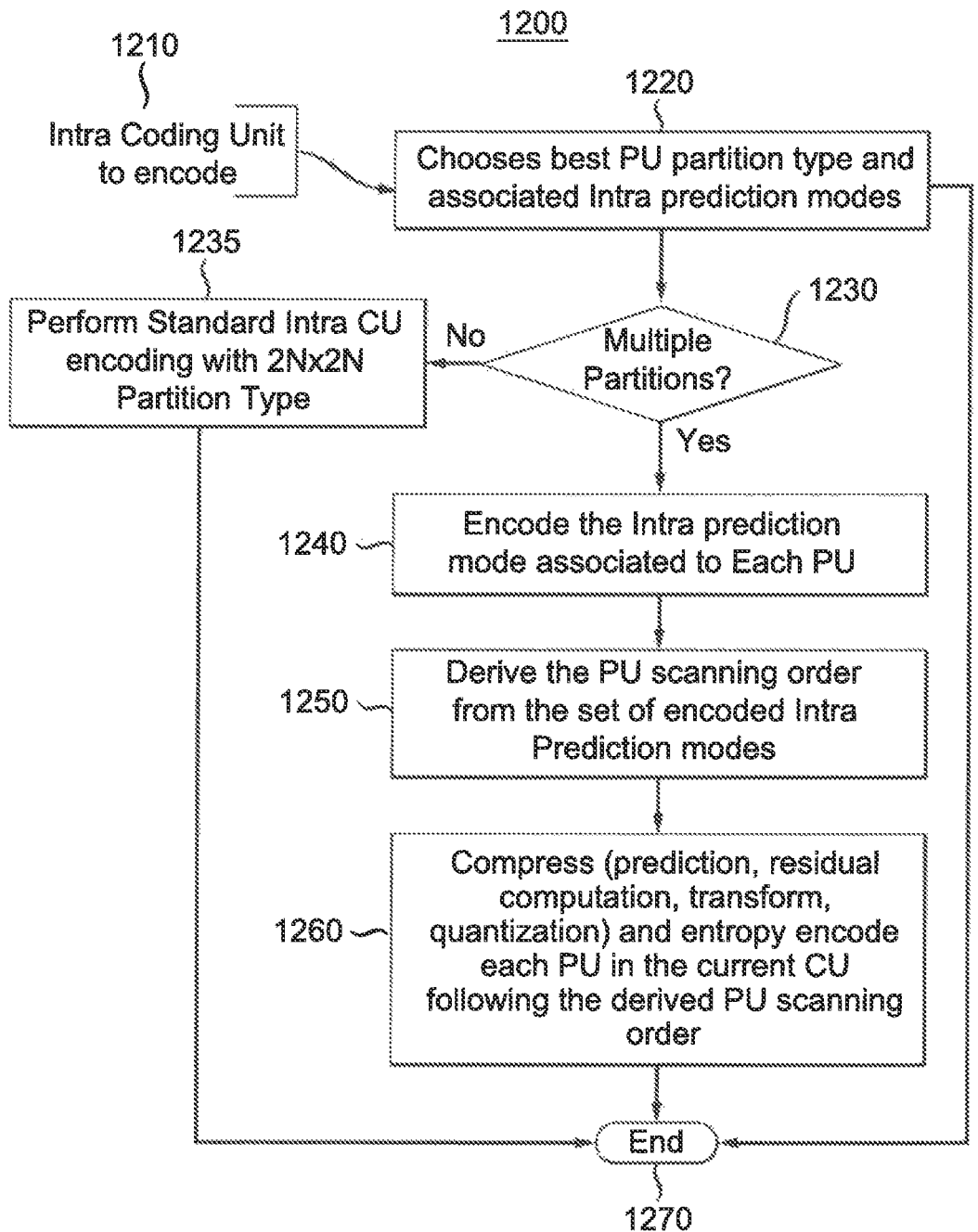
FIG. 12 also illustrates another example method according to a general aspect of at least one embodiment.

FIG. 12 illustrates the detail of an embodiment of another encoding process syntax 1200 according to the present principles. The input to this process is an intra CU to be encoded as shown at 1210 of FIG. 12. At 1220, process 1200 chooses the best PU partition type and the associated intra prediction modes if the cunent CU is to be partitioned into multiple PUs. The best PU partitioning of the CU into one or more PUs is chosen together with their associated intra prediction modes, typically in a rate distortion (RD) optimized way.

One well known and commonly used example of a determination of the rate distortion cost is defined as follows:

$$RD_{cost} = D + \lambda \times R$$

wherein D represents the distortion (typically an L2 distance) between the original block and a reconstructed block obtained by encoding and decoding the current CU with the considered candidate. R represents the rate cost, e.g. the number of bits generated by coding the current block with the considered candidate; $\lambda$ is the Lagrange parameter, which represents the rate target at which the video sequence is being encoded. The RD choice is also further described later with reference to e.g., FIG. 17 and FIG. 13.

At 1230 of FIG. 12, method 1200 verifies whether the current CTJ has been partitioned or sub-divided into multiple PUs. If the verification result at 1230 is yes. then at 1240. the corresponding intra prediction mode associated with each PU is encoded and output to the bitstream. At 1250, process 1200 derives the scanning order of the plurality of PUs based on die corresponding intra prediction mode associated with each of the PUs. This particular exemplary aspect will also be described in further detail later. At 1260. process 1200 compresses and entropy encodes the current CU, according to the derived PU scanning order On the other band, if the current CU is not further partitioned into multiple PUs as determined at 1230, then no scan order for any sub-division is requited and the current CU is encoded as a whole at 1235.

Figure 13:
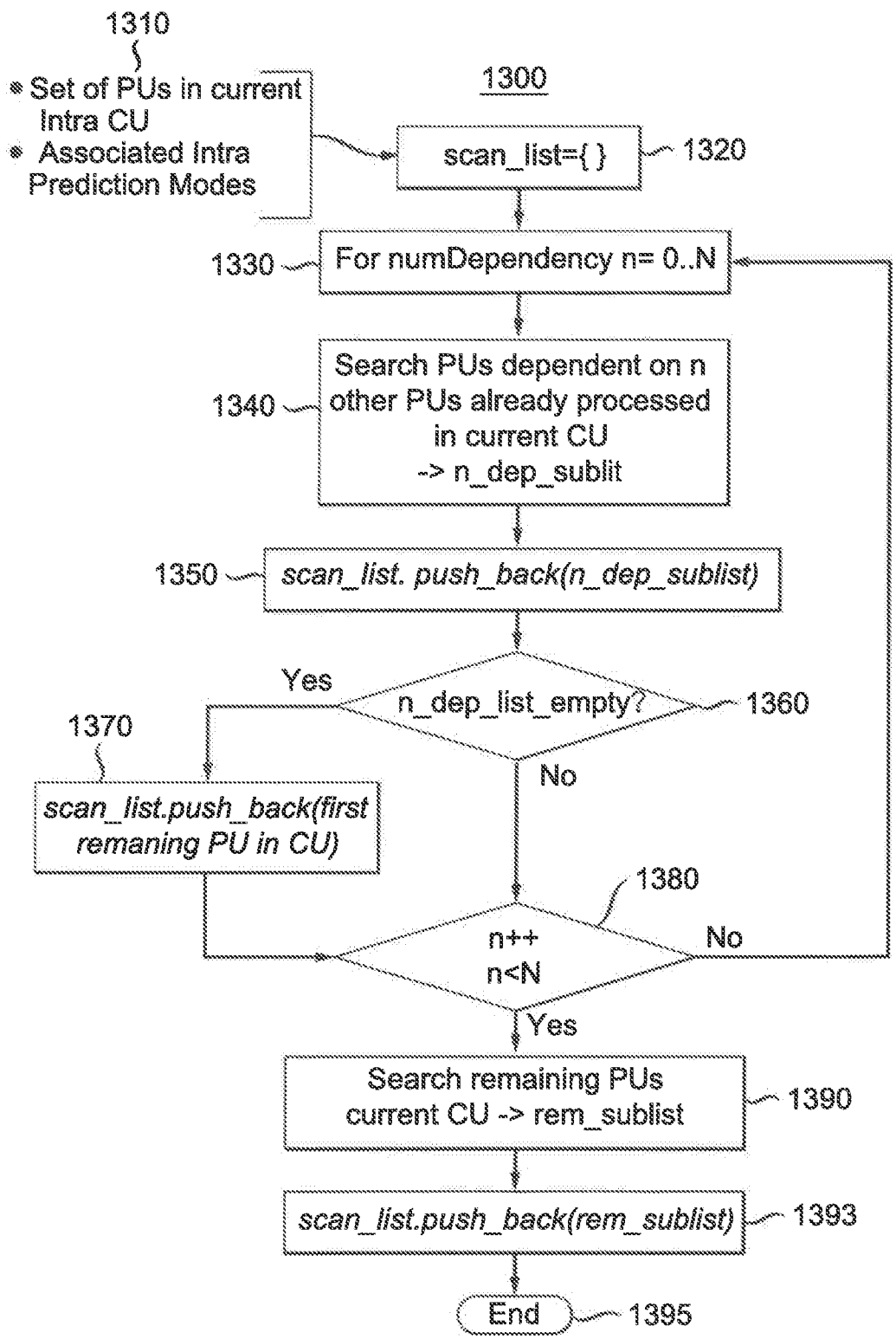
FIG. 13 also illustrates another example method according to a general aspect of at least one embodiment.

Further description of how to derive the PU scanning order, given a set of PUs used to partition an intra CU and their respective intra prediction modes, will now be provided according to the present principles. FIG. 13 shows an exemplary process 1300 on how the PU scan order may be derived. As shown at 1310, the inputs to process 1300 are a set of a plurality of PUs used to partition a given intra CU, and their corresponding intra prediction modes. Again these intra prediction modes may modes 1 to 34 in HEVC and as previously described. The output of the process 1300 is au ordered list of prediction unit indices at 1393 indicating the order in which the set of PUs will be processed during the coding and decoding processes.

At 1320 of FIG. 13, process 1300 initializes the output list to an empty set of prediction unit indices. At 1330. process 1300 iterates on a dependency number. n=0 to N (N is die maximum number of dependencies). The dependency number n is indicative of a number of the other of the plurality of PUs the each of the plurality of PUs uses for spatial prediction for the each of the plurality of PUs. Therefore, at 1340, process 1300 searches the PUs that depend on n others PUs in the considered CU, from the spatial prediction viewpoint. To do so, an algorithm that computes the number of PUs on which a current PU depends is provided. Again, this number is called the dependency number cf the current PU.

Figure 14:
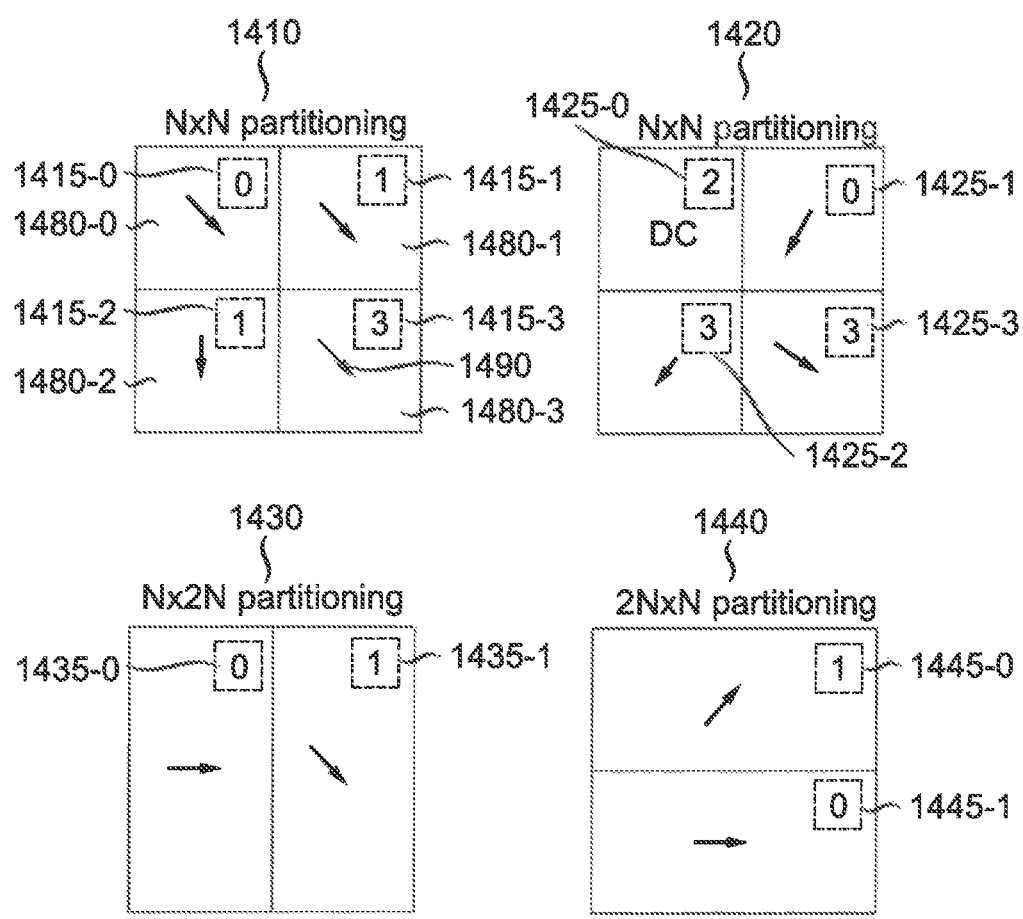
FIG. 14 illustrates how a dependency number is determined according to a general aspect of at least one embodiment.
Figure 15:
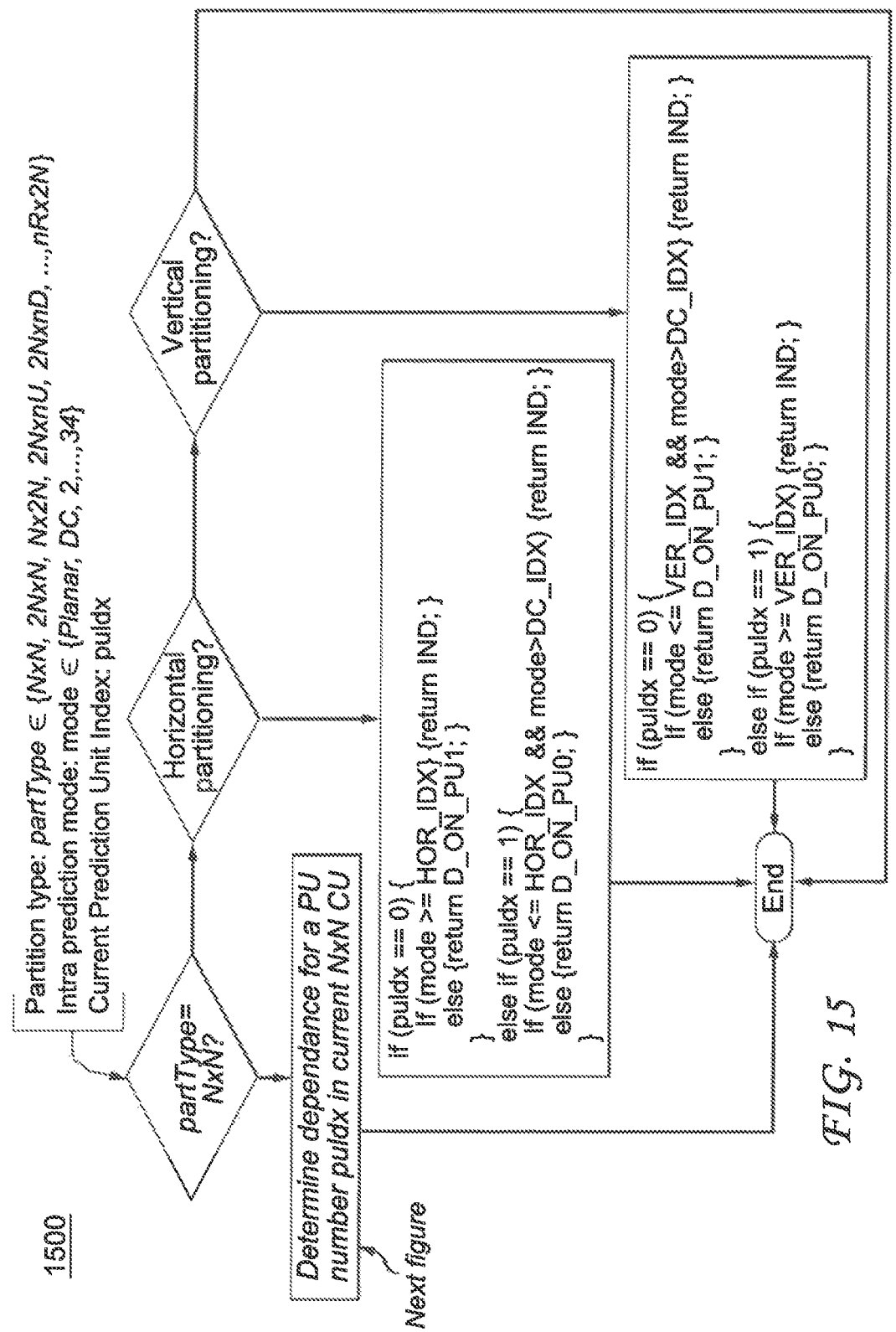
FIG. 15 illustrates another example method according to a general aspect of at least one embodiment.

FIG. 14 illustrates the concept of the dependency number for each sub-block of a current block. The process/syntax representing an algorithm for deriving these dependency numbers is also shown in FIG. 15 and FIG. 16. The algorithm computes the number of PUs m the current CU, that are used for the spatial prediction of the each PU currently being considered, given the directional intra prediction mode assigned to the current PU.

FIG. 14 illustrates the dependency concept figuratively. The number provided inside each PU of FIG. 14 represents the dependency level for each of the PUs (i.e., 1415-0 to 1415-3; 1425-0 to 1425-3; 1435-0 to 1435-1; 1445-0 to 1445-1). Visual examples for quaternary (i.e., 1410 and 1420) and binary (1430 and 1440) partitioning of the considered CU are provided. Each respective arrow in each of the considered PU represents the intra prediction mode or directional arrow for the prediction of the current PU. Accordingly, for example, for a sub-block 1480-3 of the block 1410. the intrs prediction mode or the directional arrow 1490 would indicate that all three sub-blocks 1480-1. 1480-2 and 1480-4 of the current block 1410 would be required for the special intra prediction of the current sub-block 1480-3.

Note that for DC and planar prediction modes, one may consider that these modes potentially use all surrounding PUs of the current PU in the current CU for the prediction of the current PU. in order to make the prediction as accurate as possible. According to a variant. DC and/or Planar PUs may be assigned a dependency level different from this default exemplary approach, for instance 2 or less dependencies.

Now referring back again to the iteration loop of 1330 to 1380 of FIG. 13, once PUs with dependency level equal to n are identified m current intra CU, and the u PUs they depend ou are already processed, they are added to the output list. If no PU with dependency level n was found, then the first PU, not yet added, in the current CU (according to the well-known Z-scan order) is added to the output list. If at least 2 PUs have a dependency equal to n, the first PU iu priority in the classical Z-scan order is first added. According to a variant, if no PU with dependency n with dependent PU already processed is found, the PU with the less dependency is added. This searching and adding process by increasing dependency level is iterated until a maximum dependency level is being considered at 1380, and then the remaining PU indices that are not yet in the output list are added to the output list at 1390 and 1393. still in the well-known Z-scan order. At 1395. process 1395 is ended.

FIG. 15 and FIG. 16 provide exemplary detailed syntax and processes for determining the dependency number for a sub-block (e.g., a PU) based on the different partition types and the different intra prediction modes (e.g., planar (=0). dc (=1), and angular prediction modes 2-34 of HEVC).

We now explain how the antomated PU scanning order derivation is integrated into the encoder side rate distortion optimization (RDO) process, which chooses the coding parameters associated to the considered intra CU, in view of the present principles for an overall codec.

Figure 17:
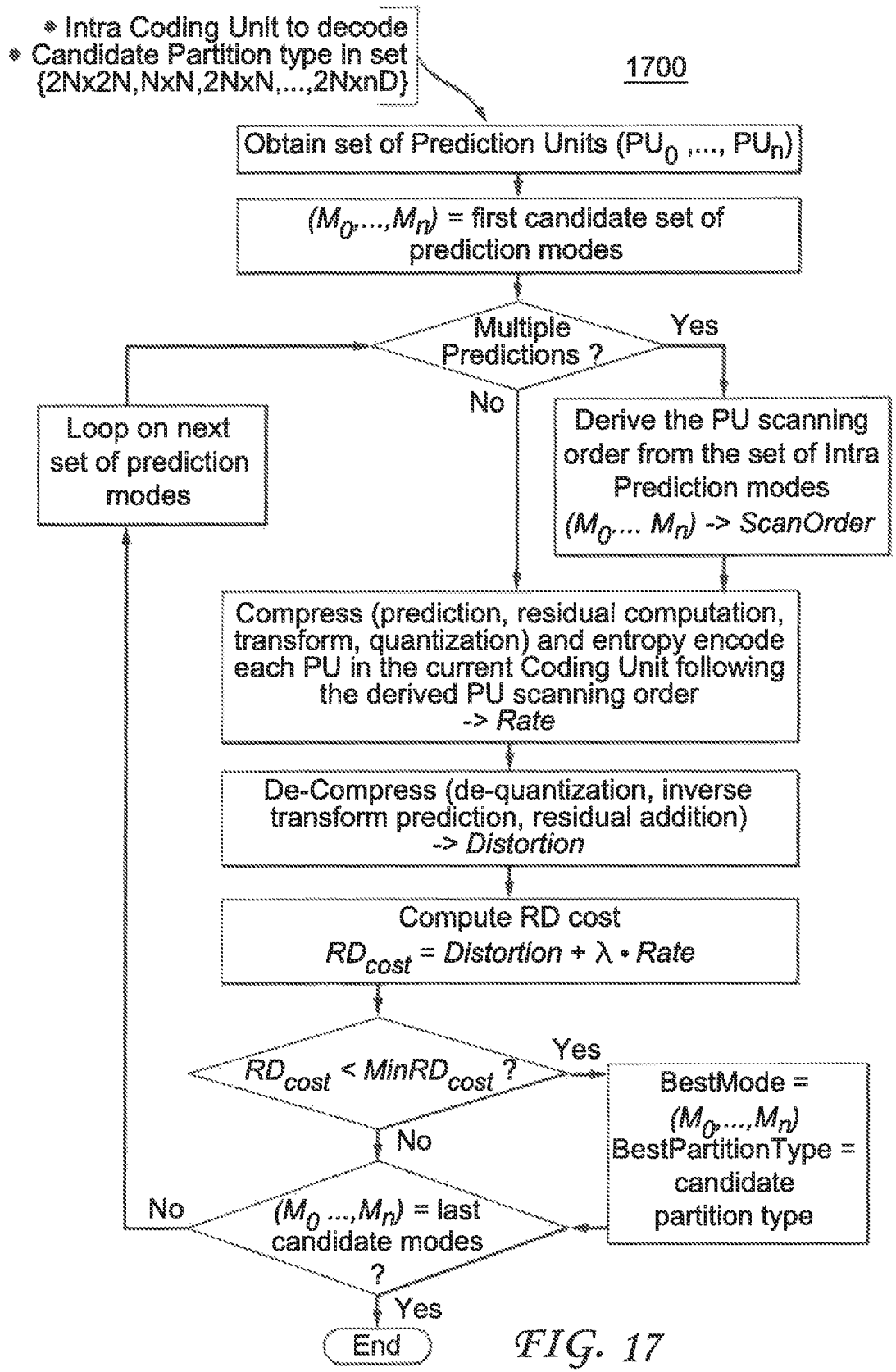
FIG. 17 illustrates another exarrrple method according to a general aspect of at least one embodiment.

An exemplary RDO process used to choose the set of intra prediction modes respectively associated to each PU of a set of candidate PUs to partition the whole intra CU is depicted by FIG. 17. This algorithm 1700 consists in jointly choosing all the prediction modes for all PUs contained in the considered CU. To do so. as shown by the exemplary process 1700 of FIG. 17, it performs a loop on each tuple of prediction modes that can be assigned to the PUs, and computes the rate distortion cost associated with that tuple, knowing that their coding decoding is performed following the proposed antomated PU scanning order derivation. Thus, for each candidate set of prediction modes ($M_0, \ldots, M_n$), the associated scanning order is deduced in the case of multiple PUs (hence prediction modes). It is derived according to the algorithm of FIG. 13 as previously described. Next, the current intra CU is being fully encoded and reconstructed according to this derived scanning order, in order to obtain the rate distortion cost and the distortion associated to the currently considered tuple of prediction modes. The Lagrangian rate distortion costs associated with the current example of intra prediction modes is computed. The example with minimum rate distortion cost is finally selected.

Figure 18:
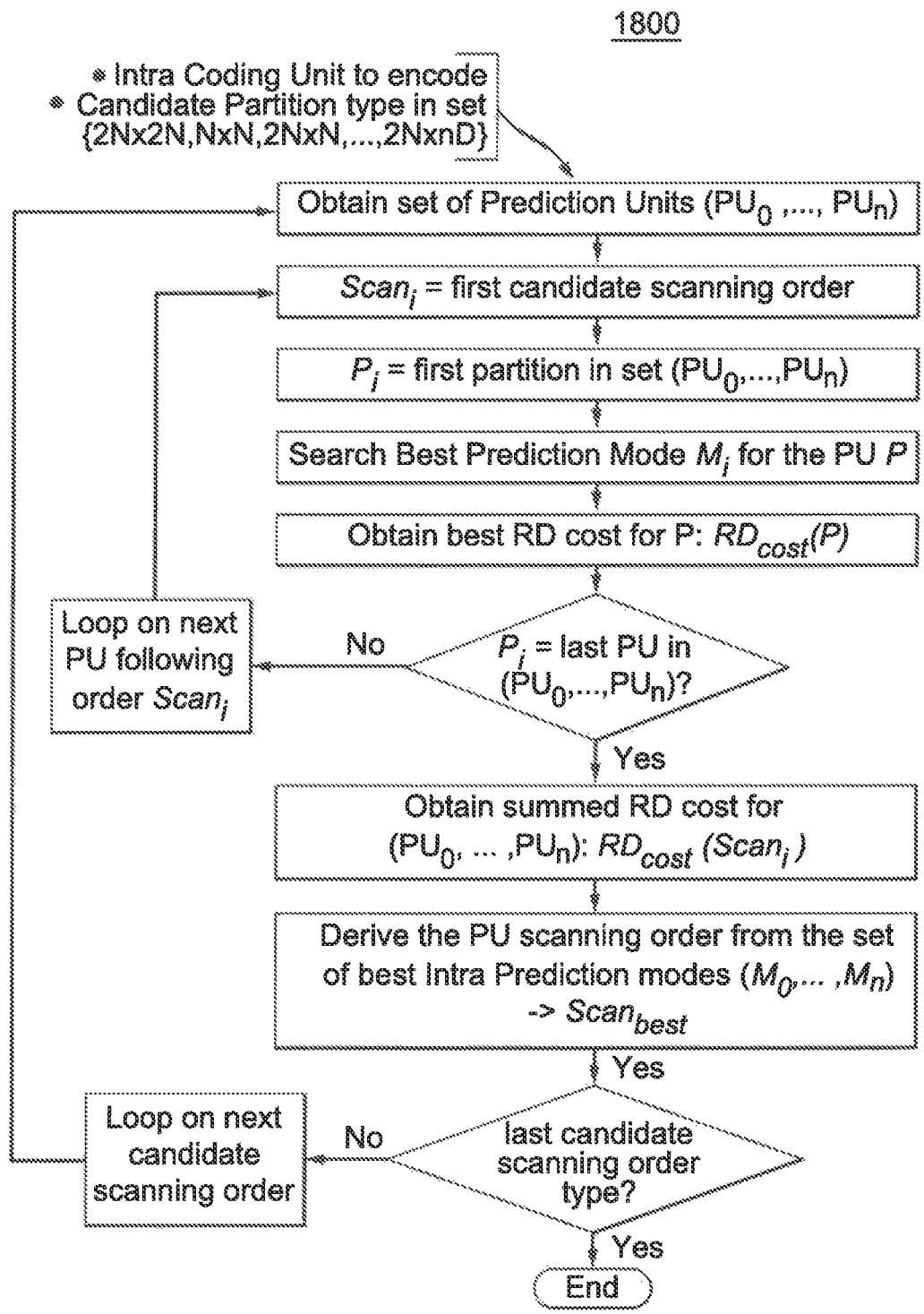
FIG. 18 illustrates another example method according to a general aspect of at least one embodiment.

A variant of the exemplary algorithm shown in FIG. 17 is shown in FIG. 18. As shown in FIG. 18, algorithm 1800 consists in the following. Given an intra Coding Unit and a candidate partitioning into a plurality of $PU_s$ ($PU_0, \ldots, PU_n$) for that CU, a loop on all possible scanning orders for the CU is perfonued. The following is also performed, having fixed a current candidate scanning order denoted as $Scan_i$. Fr each Prediction Unit PU, in the considered CU, a RD search of the best prediction mode for $PU_i$ is performed. In this loop on the PUs. PUs are successively processed according to the current candidate scanning order $Scan_i$.

Once this loop on PUs is done, then a check is made on the consistency of the obtained best prediction modes ($M_0, \ldots, M_0$) with the current candidate PU scanning order $Scan_i$. To do so. the PU scanning order derivation process of FIG. 13 is invoked. If the resulting scanning order is equal to the current candidate PU scanning order $Scan_i$, then tins means that the obtained set of direction is valid. If uot, the combination of $Scan_i$ and found intra prediction modes is not valid, and the rate distortion cost is then set to $+\infty$, to ensure that this combination is not going to be used by the encoder.

Figure 19:
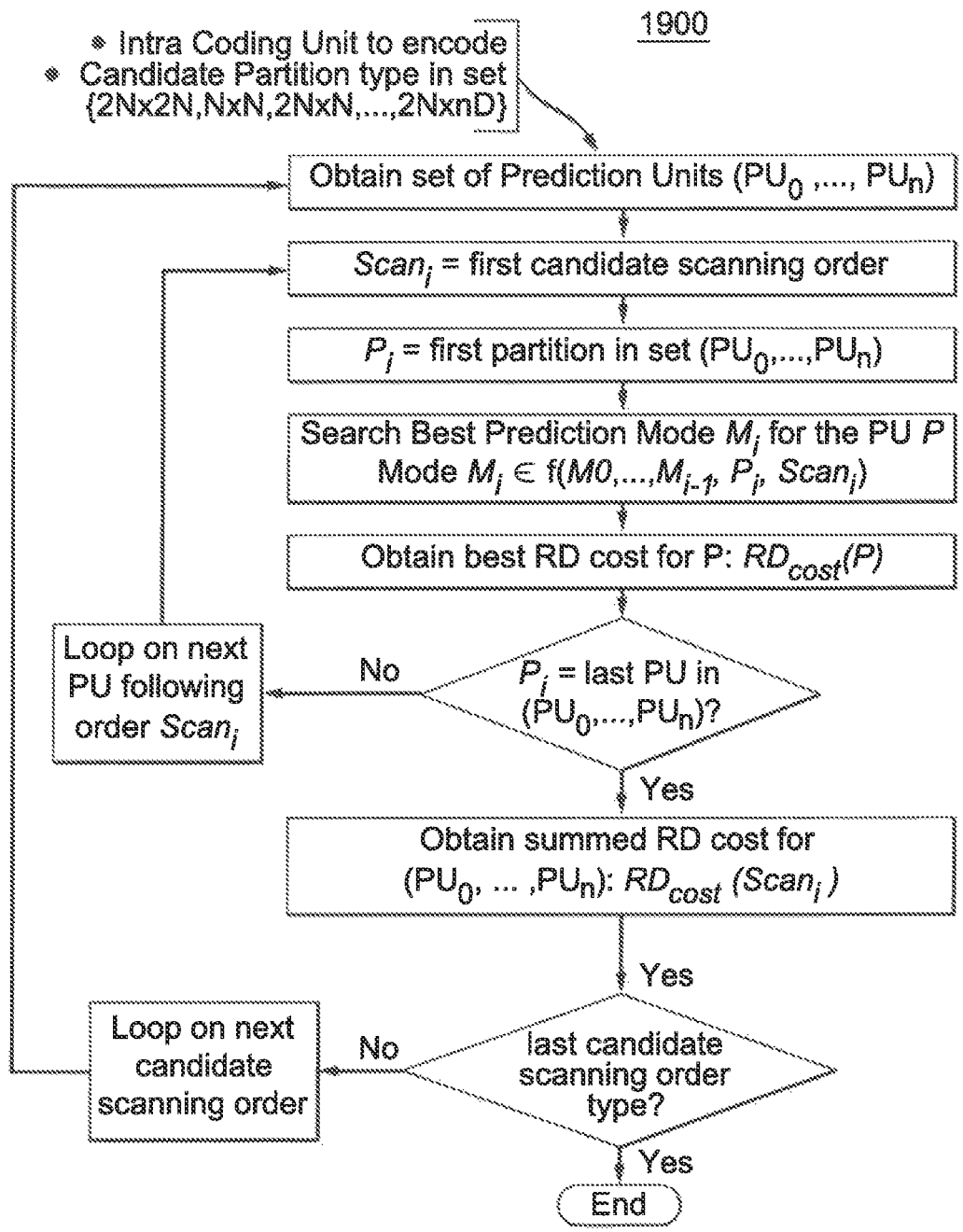
FIG. 19 illustrates another example method accor ding to a general aspect of at least one embodiment.
Figure 20:
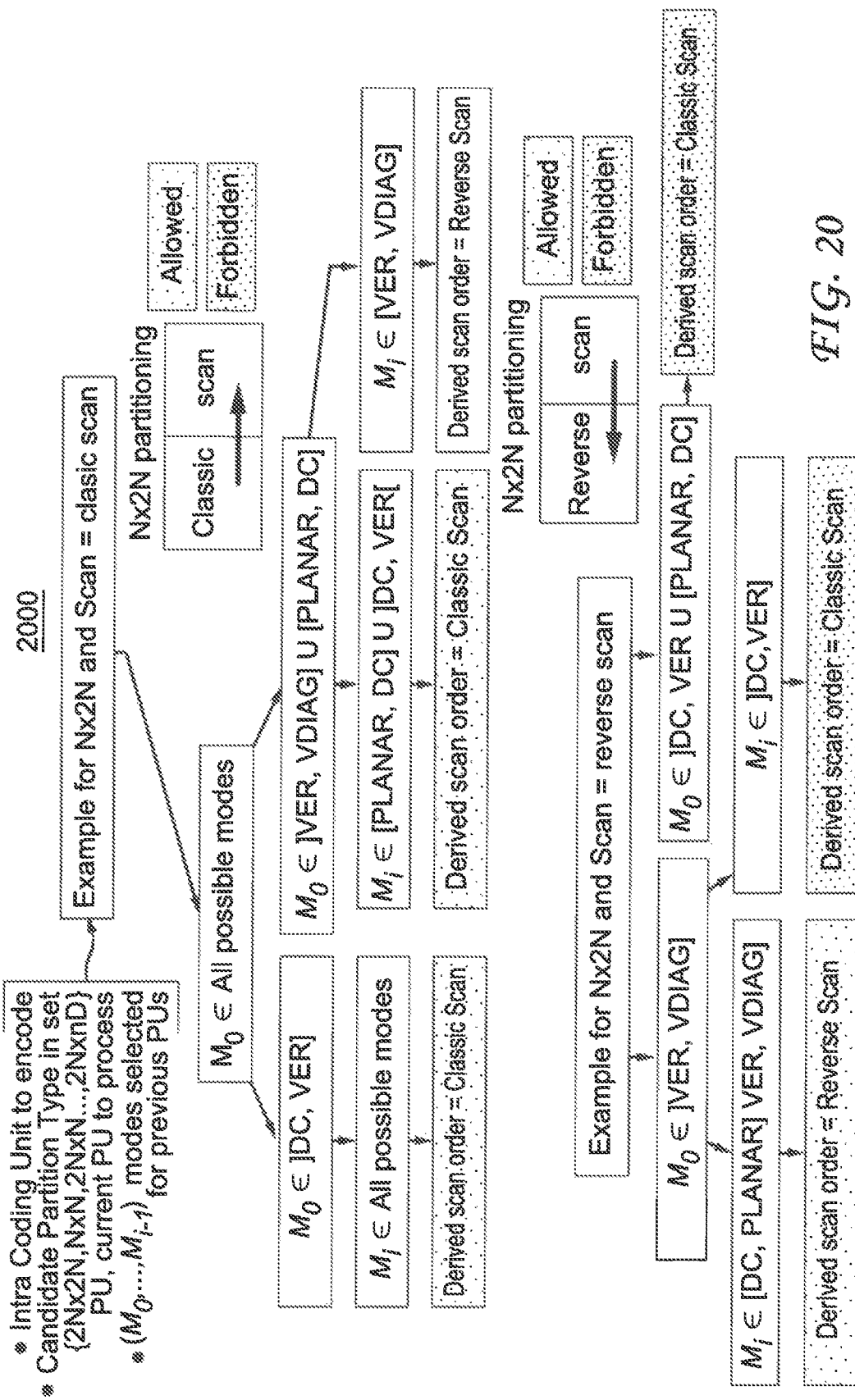
FIG. 20 illustrates another example method according to a general aspect of at least one embodiment.

FIG. 19 shows yet another exemplary variant of the exemplary algorithm shown in FIG. 17. As shown in FIG. 19, in the last variant of the algorithm, given an intra Coding Unit and a candidate partitioning into $PU_s$ ($PU_0, \ldots, PU_n$) for that CU, a loop on all possible scanning otders for the CU is performed by algorithm 1900. The following is performed, having fixed a current candidate scanning order denoted as $Scan_i$. For each Prediction Unit PU, in the considered CU. a RD search of the best prediction mode for $PU_i$ is performed, but this RD search is restricted to prediction mode allowed by the current $Scan_i$. The function that restricts prediction modes for a given PU is described and shown in FIG 20: restriction of prediction modes depending on a given scan order and prediction modes of previous PUs. In this loop on the PUs, PUs are successively processed according to the current candidate scanning order $Scan_i$. Therefore, there is no need to check the consistency of the obtained best prediction modes ($M_0, \ldots, M_n$) with the current candidate PU scanning order $Scan_i$. That is, the function provided by algorithm 2000 of FIG. 20 ensures that all the modes ($M_0, \ldots, M_n$) selected for all the $PU_s$ ($PU_0, \ldots, PU_n$) in the current CU give a derived scan order equal to $Scan_i$.

Figure 21:
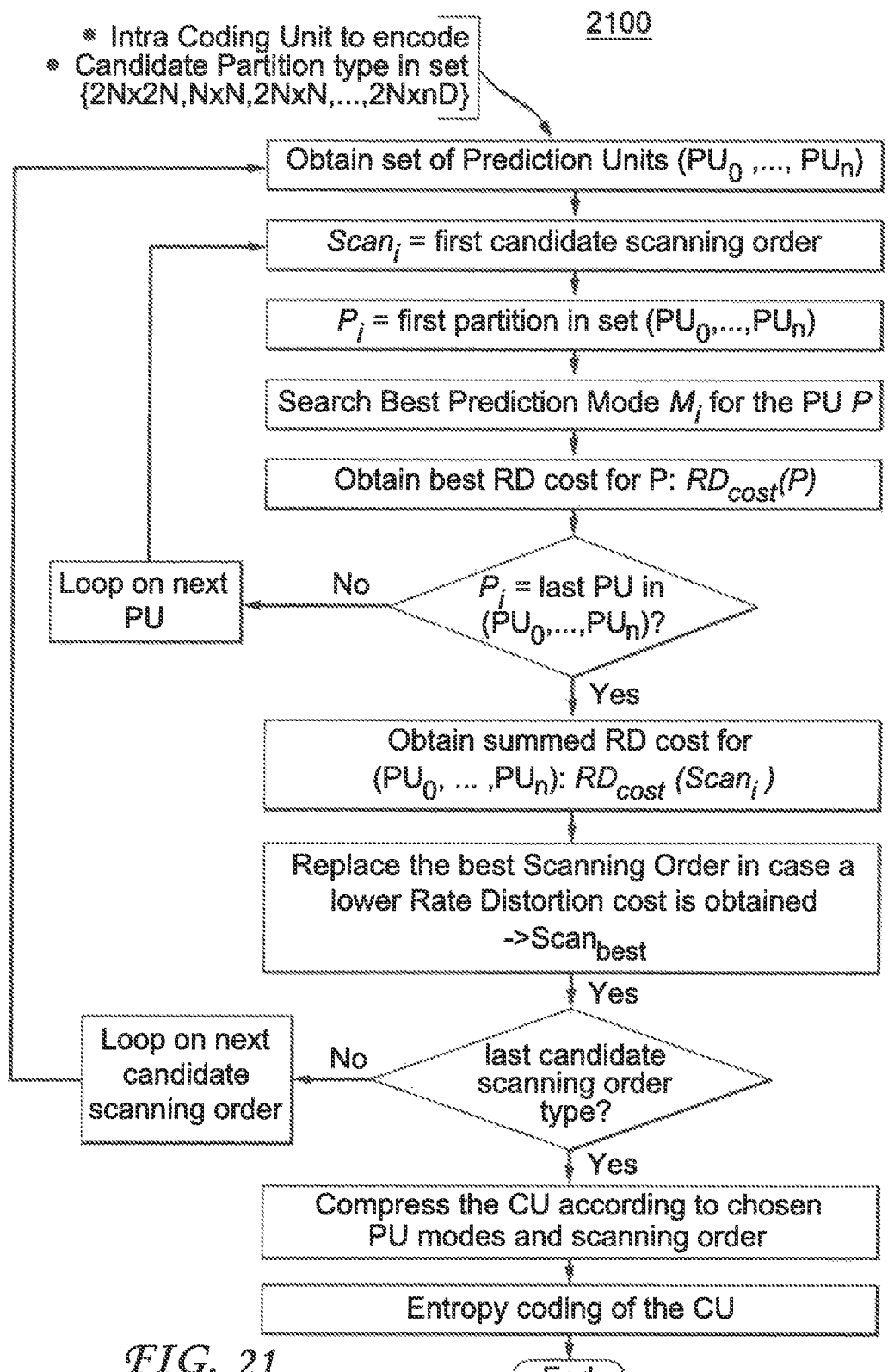
FIG. 21 illustrates another example method according to a general aspect of at least erne embodiment.

FIG. 21 provides yet another exemplary embodiment in which the proposed PU scanning derivation process may be incorporated into a codex system or method. As illustrated in FIG. 21. the exemplary process 2100 provides that all possible scanning orders are tested as potential candidates for the considered intra CU, regardless the dependency level of PUs withm the CU. Next, once the loop on candidate scanning orders is done, the scanning order with the best rate distortion cost is chosen. This leads to a set of $PU_s$ ($PU_0, \ldots, PU_n$), with associated ultra modes ($M_0, \ldots, M_n$) and selected scanning order $Scan_{best}$. Then the compression of the current infra CU and its entropy coding are applied, given the candidate partition type currently considered. The best intra modes and scanning order are obtained for this partition type.

Figure 22:
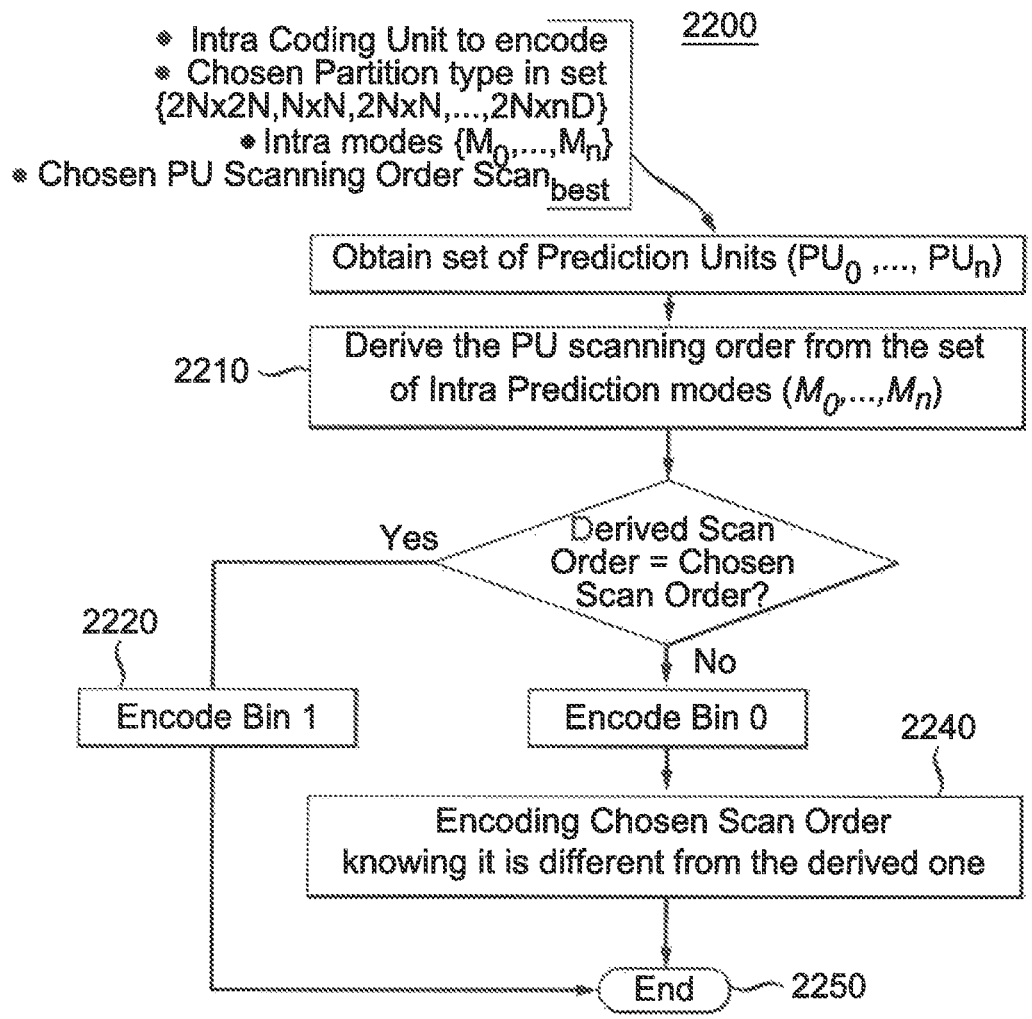
FIG. 22 illustrates another example method according to a general aspect of at least cme embodiment.

In accordance with another exemplary embodiment. FIG. 22 shows a process 2200 which provides an improved signaling of the improved scanning order described herewith. The process 2200 in FIG. 22 consists in computing the PU scanning order derived from the chosen direction modes as described before at 2210. If the so-derived PU scanning order is the same as the chosen scanning order, then a flag is ceded and output to the bitstream indicating this equality at 2220, and the process is ended, at 2250. On the decoder side, if the flag indicating five scanning order is the one deduced from the infra directions (e.g., set to 1), then the decoding order can be retrieved by invoking e.g., the process of FIG. 13 on the decoder side. If on the other hand, the two scanning orders do not coincide, then the chosen best scanning order is explicitly signaled at 2240, knowing that it is different front the deduced one.

Figure 23:
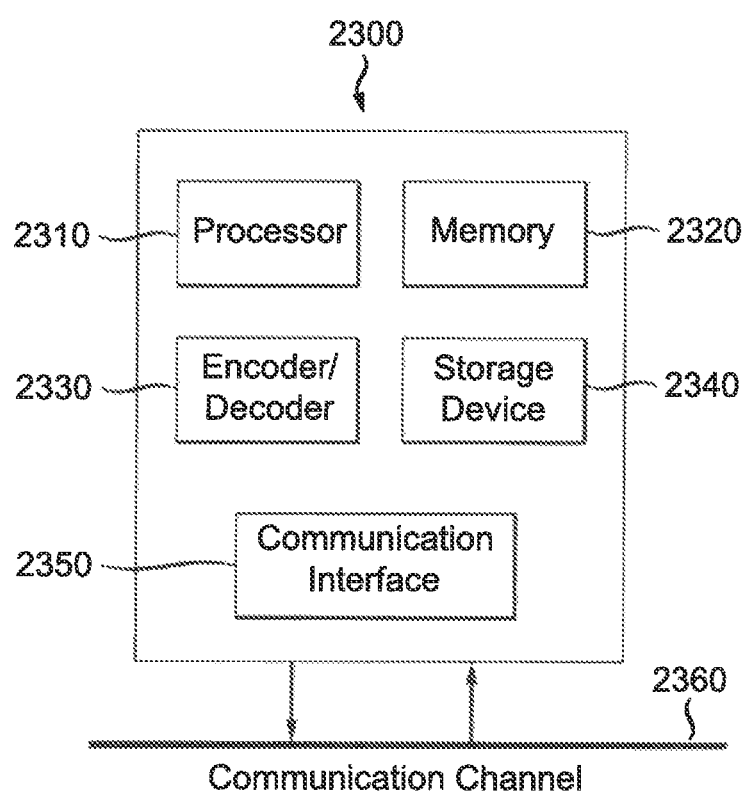
FIG. 23 illustrates a block diagram of an example apparatus in which various aspects of the embodiments may be implemented.

FIG. 23 illustrates a block diagram of an exemplary system 2300 in which various aspects of the exemplary embodiments may be implemented. The system 2300 may be embodied as a device including the various components described below and is configured to perform the processes described above. Examples of such devices, include, but are not limited to. personal computers, laptop computers, smartphones, tablet computers, digital multimedia set top boxes, digital television receivers, personal video recording systems, connected home appliances, and servers. The system 2300 may be communicatively coupled to other similar systems, and to a display via a communication channel as shown in FIG. 23 and as known by those skilled in the art to implement all or part of the exemplary video systems described above.

Various embodiments of the system 2300 include at least one processor 2310 configured to execute instructions loaded therein for implementing the various processes as discussed above. The processor 2310 may include embedded memory, input output interface, and various other circuitries as known in the art. The system 2300 may also include at least one memory 2320 (e.g., a volatile memory device, a non-volatile memory device). The system 2300 may additionally include a storage device 2340, which may include non-volatile memory, including, but not limited to, EEPROM, ROM, PROM, RAM, DRAM, SRAM, flash, magnetic disk drive, and or optical disk drive. The storage device 2340 may comprise an internal storage device, an attached storage device, and/or a network accessible storage device, as non-limiting examples. The system 2300 may also include an encoder decoder module 2330 configured to process data to provide encoded video and/or decoded video, and the encoder decoder module 2330 may include its own processor and memory.

The encoder/decoder module 2330 represents the module(s) that may be included in a device to perform the encoding and/or decoding functions. As is known, such a device may include one or both of the encoding and decoding modules. Additionally, the encoder/decoder module 2330 may be implemented as a separate element of the system 2300 or may be incorporated within one or more processors 2310 as a combination of hardware and software as blown to those skilled in the art.

Program code to be loaded onto one or more processors 2310 to perform the various processes described hereinabove may be stored in the storage device 2340 and subsequently loaded onto the memory 2320 for execution by the processors 2310. In accordance with the exemplary embodiments, one or more of the processor(s) 2310. the memory 2320. the storage device 2340, and the encoder decoder module 2330 may store one or mote of the various items dining the performance of the processes discussed herein above, including, but not limited to the input video, the decoded video, the bitstream, equations, formulas, matrices, variables, operations, and operational logic.

The system 2300 may also include a communication interface 2350 that enables communication with other devices via a communication channel 2360. The communication interface 2350 may include, but is not limited to a transceiver configured to transmit and receive data from the communication channel 2360. The communication interface 2350 may include, but is not limited to, a modem or network card and the communication channel 2350 may be implemented within a wired and/or wireless medium. The various components of the system 2300 may be connected or communicatively coupled together (not shown in FIG. 23) using various suitable connections, including, but not limited to internal buses, wires, and printed circuit boards.

The exemplary embodiments may be carried out by computer software implemented by the processor 2310 or by hardware, or by a combination of hardware and software. As a non-limiting example, the exemplary embodiments may be implemented by one or more integrated circuits. The memory 2320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 2310 may be of any type appropriate to the technical environment, and may encompass one or more of microprocessor, general purpose computers, special purpose computers, and processors based ou a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in. for example, an apparatus such as, for example, a processor, which refers to processing devices in general, including, for example, a computer, a microprocessor, an integrated circuit, or a programmable logic device. Processors also include communication devices, such as, for example, computers, cell phones, portable personal digital assistants ("PDAs"), and oilier devices that facilitate communication of information between end-users.

Furthermore, one skilled in the art may readily appreciate that the exemplary HEVC encoder 100 shown in FIG. 1 and the exemplary HEVC decoder shown in FIG. 3 may be modified according to the above teachings of the present disclosure in order to implement the disclosed improvements to the existing HEVC standards for achieving better compression/decompression. For example, entropy coding 145, motion compensation 170. and/or motion estimation 175 in the exemplary encoder 100 of FIG. 1, and entropy decoding 330, and or motion compensation 375, in the exemplary decoder of FIG. 3 may be modified according to the disclosed teachings to implement one or more exemplary aspects of the present principles.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of iufonnation. Determining the information may include one or more of, for example, estimating tire information, calculating the information, predicting the information, or retrieving the information from memory.

Further, this application or its claims may refer to "accessing" various pieces of information Accessing the information may include one or more of, for example, receiving the informatiou, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, dining operations such as. for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. An apparatus for video encoding, comprising a processor, configured to perform:

determining, for a current block being encoded in a picture, an intra prediction mode for each of a plurality of sub-blocks subdivided from the current block;

determining, based on the determined intra prediction mode for each of the plurality of sub-blocks, a corresponding dependency number indicating a number of other ones of the plurality of sub-blocks each of the plurality of sub-blocks used for spatial prediction;

determining a scan order of the plurality of sub-blocks based on the determined corresponding dependency number for each of the plurality of the sub-blocks; and encoding the current block using the determined scan order of the plurality of sub-blocks, wherein the scan order is determined in that if two sub-blocks of the plurality of the sub-blocks have same determined dependency numbers, a z-scan order is used for scanning the two sub-blocks.

2. The apparatus of claim 1, wherein if a selected sub-block has an intra prediction mode of DC or planar then the determined dependency number for the selected sub-block is set to a default number.

3. The apparatus of claim 2, wherein the default number is 0, 1, 2 or 3.

4. An apparatus for video decoding, comprising a processor, configured to perform:

determining, for a current block being decoded in a picture, an intra prediction mode for each of a plurality of sub-blocks being subdivided from the current block;

determining, based on the determined intra prediction mode for each of the plurality of sub-blocks, a corresponding dependency number indicating a number of other ones of the plurality of sub-blocks each of the plurality of sub-blocks used for spatial prediction;

determining a scan order of the plurality of sub-blocks based on the determined corresponding dependency number for each of the plurality of the sub-blocks; and decoding the current block using the determined scan order of the plurality of sub-blocks, wherein the scan order is determined in that if two sub-blocks of the plurality of the sub-blocks have same determined dependency numbers, a z-scan order is used for scanning the two sub-blocks.

5. The apparatus of claim 4, wherein if a selected sub-block has an intra prediction mode of DC or planar then the determined dependency number for the selected sub-block is set to a default number.

6. The apparatus of claim 5, wherein the default number is 0, 1, 2 or 3.

7. A method for video encoding, comprising:

determining, for a current block being encoded in a picture, an intra prediction mode for each of a plurality of sub-blocks subdivided from the current block;

determining, based on the determined intra prediction mode for each of the plurality of sub-blocks, a corresponding dependency number indicating a number of other ones of the plurality of sub-blocks each of the plurality of sub-blocks used for spatial prediction;

determining a scan order of the plurality of sub-blocks based on the determined corresponding dependency number for each of the plurality of the sub-blocks; and encoding the current block using the determined scan order of the plurality of sub-blocks, wherein the scan order is determined in that if two sub-blocks of the plurality of the sub-blocks have same determined dependency numbers, a z-scan order is used for scanning the two sub-blocks.

8. The method according to claim 7, wherein if a selected sub-block has an intra prediction mode of DC or planar then the determined dependency number for the selected sub-block is set to a default number.

9. The method of claim 8 wherein the default number is 0, 1, 2 or 3.

10. The method of claim 7, wherein the determined scan order of the plurality of the sub-blocks is signaled in a bitstream representing the picture.

11. The method of claim 7, wherein the plurality of the sub-blocks are prediction blocks.

12. A method for video encoding, comprising:

determining, for a current block being encoded in a picture, an intra prediction mode for each of a plurality of sub-blocks subdivided from the current block;

determining, based on the determined intra prediction mode for each of the plurality of sub-blocks, a corresponding dependency number indicating a number of other ones of the plurality of sub-blocks each of the plurality of sub-blocks used for spatial prediction;

determining a scan order of the plurality of sub-blocks based on the determined corresponding dependency number for each of the plurality of the sub-blocks; and encoding the current block using the determined scan order of the plurality of sub-blocks, wherein if one of the plurality of the sub-blocks is further subdivided into a plurality of further-subdivided sub-blocks, a scan order of the plurality of the further-subdivided sub-blocks is set to be a similar order as the determined scan order of the plurality of the sub-blocks.

13. A non-transitory computer readable medium containing data content generated according to the method of claim 7.

14. A method for video decoding, comprising:

determining, for a current block being decoded in a picture, an intra prediction mode for each of a plurality of sub-blocks subdivided from the current block;

determining, based on the determined intra prediction mode for each of the plurality of sub-blocks, a corresponding dependency number indicating a number of other ones of the plurality of sub-blocks each of the plurality of sub-blocks used for spatial prediction;

determining a scan order of the plurality of sub-blocks based on the determined corresponding dependency number for each of the plurality of the sub-blocks; and decoding the current block using the determined scan order of the plurality of sub-block, wherein the scan order is determined in that if two sub-blocks of the plurality of the sub-blocks have same determined dependency numbers, a z-scan order is used for scanning the two sub-blocks.

15. A non-transitory computer readable medium storing executable program instructions that, when executed by a processor, perform the method of claim 14.

16. The method according to claim 14, wherein if a selected sub-block has an intra prediction mode of DC or planar then the determined dependency number for the selected sub-block is set to a default number.

17. The method of claim 16, wherein the default number is 0, 1, 2 or 3.

18. The method of claim 14, wherein the plurality of the sub-blocks are prediction blocks.

19. A method for video decoding, comprising:

determining, for a current block being decoded in a picture, an intra prediction mode for each of a plurality of sub-blocks subdivided from the current block;

determining, based on the determined intra prediction mode for each of the plurality of sub-blocks, a corresponding dependency number indicating a number of other ones of the plurality of sub-blocks each of the plurality of sub-blocks used for spatial prediction;

determining a scan order of the plurality of sub-blocks based on the determined corresponding dependency number for each of the plurality of the sub-blocks; and decoding the current block using the determined scan order of the plurality of sub-block, wherein if one of the plurality of the sub-blocks is further subdivided into a plurality of further-subdivided sub-blocks, a scan order of the plurality of the further-subdivided sub-blocks is set to be a similar order as the determined scan order of the plurality of the sub-blocks.

* * * * *